United States Patent
Khan et al.

(10) Patent No.: US 10,060,227 B2
(45) Date of Patent: Aug. 28, 2018

(54) SYSTEMS AND METHODS FOR DEVELOPING HYDROCARBON RESERVOIRS

(71) Applicant: Saudi Arabian Oil Company, Dhahran (SA)

(72) Inventors: Waqas Ahmed Khan, Dhahran (SA); Keyang Dai, Dhahran (SA); Lautaro Rayo, Dhahran (SA); Abdulhamed Alfaleh, Al Khobar (SA); Khalid Ali Nasser, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 66 days.

(21) Appl. No.: 15/226,127

(22) Filed: Aug. 2, 2016

(65) Prior Publication Data

US 2018/0038204 A1    Feb. 8, 2018

(51) Int. Cl.
*E21B 41/00* (2006.01)
*E21B 47/022* (2012.01)
(Continued)

(52) U.S. Cl.
CPC ............ *E21B 41/0092* (2013.01); *E21B 7/04* (2013.01); *E21B 43/30* (2013.01); *E21B 47/022* (2013.01);
(Continued)

(58) Field of Classification Search
CPC .......................... E21B 41/0092; E21B 43/30
See application file for complete search history.

(56) References Cited

U.S. PATENT DOCUMENTS

| 6,549,879 B1 | 4/2003 | Cullick et al. |
| 6,980,940 B1 | 12/2005 | Gurpinar et al. |

(Continued)

FOREIGN PATENT DOCUMENTS

| GB | 2467032 A | 7/2010 |
| WO | WO2010056415 A1 | 5/2010 |
| WO | WO2010080270 A1 | 7/2010 |

OTHER PUBLICATIONS

Schlumberger; "RapidPlan 2.0 Integrated strategy for fast-track field development planning" accessible at: www.slb.com/production; 2011; pp. 1-2.
(Continued)

*Primary Examiner* — D. Andrews
*Assistant Examiner* — Dany E Akakpo
(74) *Attorney, Agent, or Firm* — Bracewell LLP; Constance G. Rhebergen; Christopher L. Drymalla

(57) ABSTRACT

Provided in some embodiments are systems and methods for developing a hydrocarbon reservoir. A method may include, for each of a plurality of prosed hydrocarbon wells, determining a reservoir entry point corresponding to a location at a top limiting surface of the hydrocarbon reservoir, determining a reservoir exit point corresponding to a location at a bottom limiting surface of the hydrocarbon reservoir, and determining a well trajectory that includes a path that extends downward gradually from the reservoir entry point at the top limiting surface to reservoir exit point at the bottom limiting surface. The method also including generating a field development plan (FDP) for the hydrocarbon reservoir, the FDP including development information for each well of the plurality of wells, including the determined well trajectory for the well.

24 Claims, 10 Drawing Sheets

(51) Int. Cl.
*E21B 49/00* (2006.01)
*E21B 7/04* (2006.01)
*G01V 1/24* (2006.01)
*G01V 1/28* (2006.01)
*G06Q 50/00* (2012.01)
*E21B 43/30* (2006.01)

(52) U.S. Cl.
CPC .............. *E21B 49/00* (2013.01); *G01V 1/247* (2013.01); *G01V 1/282* (2013.01); *G06Q 50/00* (2013.01)

(56) References Cited

U.S. PATENT DOCUMENTS

| | | |
|---|---|---|
| 7,460,957 B2 | 12/2008 | Prange et al. |
| 7,478,024 B2 | 1/2009 | Gurpinar et al. |
| 7,925,482 B2 | 4/2011 | Kennon et al. |
| 8,793,111 B2 | 7/2014 | Tilke et al. |
| 8,892,407 B2 | 11/2014 | Budiman et al. |
| 8,931,580 B2 | 1/2015 | Cheng et al. |
| 9,228,425 B2 | 1/2016 | Ganguly et al. |
| 2008/0300793 A1 | 12/2008 | Tilke et al. |
| 2011/0307230 A1 | 12/2011 | Lee et al. |
| 2013/0020131 A1* | 1/2013 | Le Ravalec .............. E21B 43/30 175/50 |
| 2015/0094994 A1 | 4/2015 | Sequeira, Jr. et al. |
| 2015/0220861 A1 | 8/2015 | Sanchez et al. |
| 2016/0003008 A1 | 1/2016 | Uribe et al. |
| 2016/0034818 A1 | 2/2016 | Knecht et al. |
| 2016/0102530 A1* | 4/2016 | Baranov ................. E21B 43/00 703/10 |

OTHER PUBLICATIONS

Schlumberger; "Well Pattern Design" accessible as of Aug. 1, 2016 at: https://www.ocean.slb/com/en/plug-ins/plugindetails?ProductID=pwpn-b1; pp. 1.

Al-Baqawi et al. "SPE 149084 Effective Well Placement and Trajectory Planning Approach through Collaboration Environment Tools", Society of Petroleum Engineers, May 2011, pp. 1-10.

International Search Report and Written Opinion for International Application No. PCT/US2017/044782 (SA5525); International Filing Date Aug. 1, 2017; dated Nov. 8, 2017 (pp. 1-14).

* cited by examiner

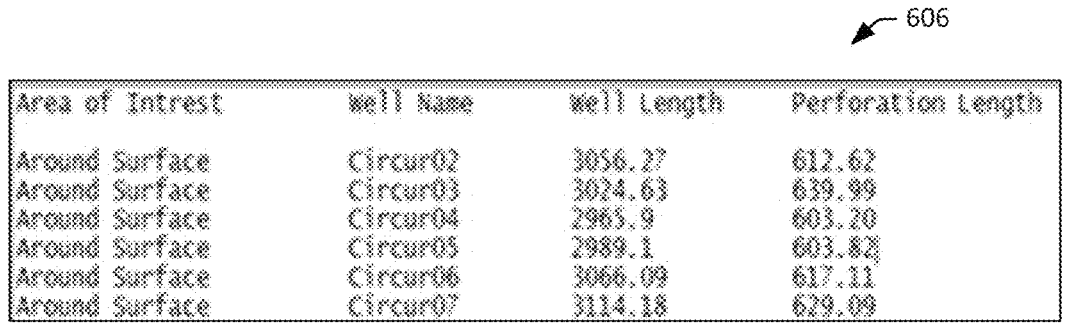
FIG. 6C
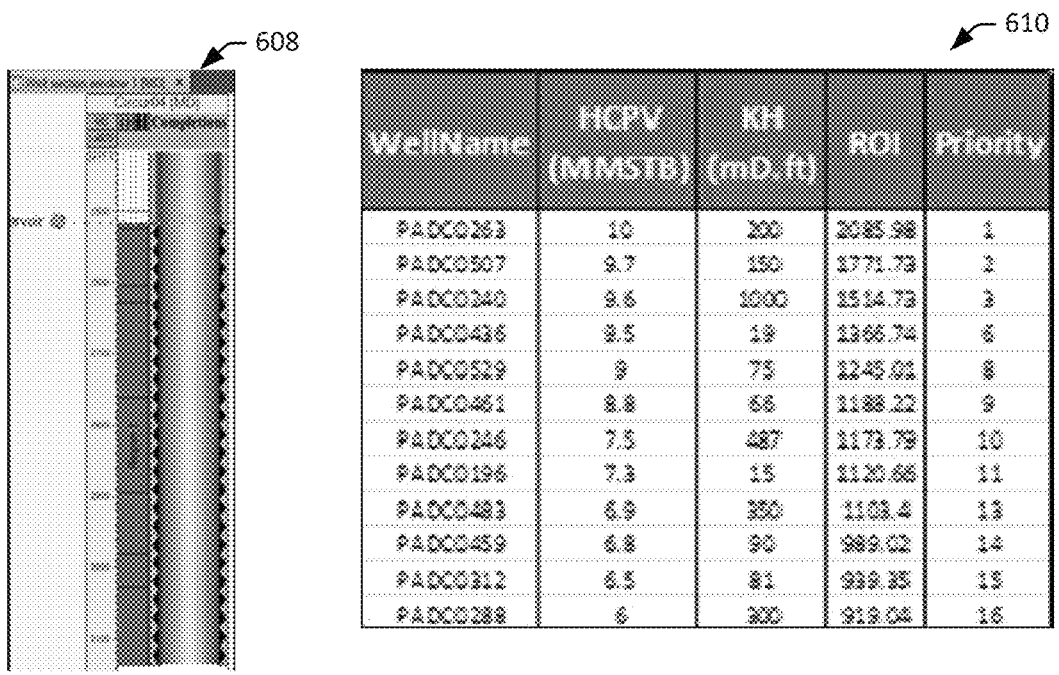
FIG. 6D
FIG. 6E

SYSTEMS AND METHODS FOR DEVELOPING HYDROCARBON RESERVOIRS

FIELD OF INVENTION

The present invention relates generally to production of hydrocarbons and more particularly to systems and methods for developing hydrocarbon reservoirs, including generating and employing field development plans for developing hydrocarbon reservoirs.

BACKGROUND OF THE INVENTION

Petroleum exploration and production typically emphasizes optimizing production of hydrocarbons from subsurface reservoirs in a safe and efficient manner. This can include drilling multiple wells into the formation of a reservoir to extract hydrocarbons (e.g., oil) trapped in the reservoir. A region that includes multiple wells may be referred to as a field. To assist in developing hydrocarbon reservoirs, field development plans (FDPs) are often created to model activities and processes for developing a reservoir. An FDP can include, for example, a layout of well locations, surface and subsurface features, surface facilities, and the like. Such FDPs can be useful to model how a field of wells can be developed and to outline a strategy to safely and efficiently recover hydrocarbons from the reservoir. FDPs are often developed manually, based on general knowledge of the reservoir's characteristics. For example, a team of geologist, geophysicists and engineers may study geologic maps of the reservoir, select locations for wells and manually create trajectories for the wells that are expected to maximize production of hydrocarbons from the reservoir.

SUMMARY OF THE INVENTION

Applicants have recognized that existing techniques for developing hydrocarbon reservoirs, including manually generating FDPs for developing hydrocarbon reservoirs, are generally often unsuitable for developing timely and cost efficient FDPs in may scenarios. For example, although manual generation of FDPs (e.g., including manually selecting well locations and well trajectories) may be suitable for small, simple reservoir where, for example, there are only a few wells to be drilled and few limitations on the placement of the wells, the task of generating a FDP can be exponentially more difficult, time consuming and costly in more complex situations in which there are more factors to consider. Applicants have recognized that, in the case where a relatively large number of wells are to be developed in a reservoir with various geographic limitations (e.g., faults, existing well sites and the like), it can be increasing difficult to generate a FDP that honors optimizes the production potential of the reservoir in an efficient manner, while honoring constraints for the FDP, such as threshold distances between wells, well trajectories, and/or geographic features, minimum/maximum well lengths, minimum/maximum accumulated perforation lengths, and/or the like. Moreover, even if a FDP is successfully developed, any changes to the FDP can create a cascading of issues that can be difficult to resolve, creating costly delays to generate a new or updated FDP. For example, if a well site needs to be added or moved after an initial FDP is developed, the location and configuration of some or all of the wells of the FDP may need to be altered. Similarly, if a geographic feature (e.g., a fault plane) is discovered after an initial FDP is developed, the location and configuration of some or all of the wells of the FDP may need to be altered. These types of changes can have a ripple effect, necessitating dramatic changes throughout the FDP. As a result, a developer may have abandon or alter the FDP, leading to significant cost and delays (e.g., delays of days, weeks or months).

Recognizing these and other shortcomings of existing techniques, Applicants have developed novel systems and methods for developing hydrocarbon reservoirs, including generating and employing FDPs for developing hydrocarbon reservoirs. Certain embodiments provide for rapidly generating FDPs to optimize the production potential of a hydrocarbon reservoir, by for example, generating a set of proposed wells that maximize contact with a pay-zone of the reservoir. In some embodiments, an FDP can be generated based on little to no user input, while honoring the constraints of the reservoir and maximizing contact with a pay-zone of the reservoir. In some embodiments, trajectories for wells of the FDP are generated to include a reservoir contact section that extends from a first point at a top limiting surface of a pay-zone of the reservoir to second point a bottom limiting surface of the pay-zone of the reservoir. In some embodiments, the reservoir contact section follows a calculated path having a depth that is proportional to the difference between the top and bottom limiting surfaces and a function of location. Such a path can to maximize the trajectory's contact with the pay-zone. Further, the described embodiments can enable an FDP for a reservoir to be generated rapidly (e.g., within minutes or hours), thereby enabling any changes in parameters to be accounted for with little to no delay in generating an updated FDP and developing the reservoir. The ability to rapidly generate FDPs can enable developers to experiment with different sets of constraints prior to committing to a particular FDP—a luxury that was not available with existing techniques that can require weeks or months to develop a FDP. For example, employing the FDP generation techniques described herein, a developer can generate multiple FDPs based on different sets of constraints (e.g., within hours), review the FDPs, and select and employ a particular one of the FDPs that the developer believes will provide the best solution to develop the reservoir.

Provided in some embodiments is a system for developing a hydrocarbon reservoir. The system including: a seismic system adapted to conduct seismic testing of a hydrocarbon reservoir to generate seismic data for the hydrocarbon reservoir; a logging system adapted to conduct logging of one or more wells in the reservoir to generate log data for the hydrocarbon reservoir; a field development system adapted to: determine, based on the seismic data and the log data for the hydrocarbon reservoir, a subsurface mapping of the reservoir, the mapping including: a top limiting surface of the hydrocarbon reservoir; and a bottom limiting surface of the hydrocarbon reservoir; for each well of a plurality of wells proposed to be drilled into the hydrocarbon reservoir: determine well parameters including: a proposed well location indicative of a surface location of the well; a well azimuth indicative of a direction of a borehole for the well; and a well length indicative of a horizontal distance for the well; determine a reservoir entry location at or near the proposed well location; determine a reservoir exit location located a distance from the reservoir entry location corresponding to the well length and in a direction corresponding to the well azimuth; determine a reservoir entry point corresponding to a location at a depth of the top limiting surface directly below the reservoir entry location; determine a reservoir exit point corresponding to a location at a depth of the bottom limiting surface directly below the reservoir exit location; and determine a well trajectory including: a main bore section extending from the reservoir entry location to the reservoir entry point; and a reservoir contact section extending from the reservoir entry location to the reservoir exit location, the reservoir contact section being contained between the top limiting surface and the bottom limiting surface, and the reservoir contact section including a series of well trajectory points from the reservoir entry location to the reservoir exit location, each of the well trajectory points located at a depth that is proportionally closer to the bottom limiting surface than the top limiting surface than any preceding well trajectory points of the series that are closer to the reservoir entry location such that the well trajectory includes a path that extends downward gradually from the top limiting surface to the bottom limiting surface; and generate a field development plan (FDP) for the hydrocarbon reservoir, the FDP including development information for each well of the plurality of wells, the development information for each well including the determined well trajectory for the well; and a well drilling system adapted to drill a borehole for one or more of the plurality of wells, the borehole for each of the one or more wells including a borehole having a trajectory corresponding to the well trajectory for the well.

In certain embodiments, a depth for each point of the series of well trajectory points of the reservoir contact section of the well trajectory for each well is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0.

In some embodiments, the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

Provided in some embodiments is a system for developing a hydrocarbon reservoir, the system adapted to: determine a top limiting surface of a hydrocarbon reservoir; determine a top limiting surface of a hydrocarbon reservoir; determine a bottom limiting surface of the hydrocarbon reservoir; determine a free water level of the hydrocarbon reservoir; for each well of a plurality of wells proposed to be drilled into the hydrocarbon reservoir: determine well parameters including: a proposed well location indicative of a surface location of the well; a well azimuth indicative of a direction of a borehole for the well; and a well length indicative of a horizontal distance for the well; determine a reservoir entry location at or near the proposed well location; determine a reservoir exit location located a distance from the reservoir entry location corresponding to the well length and in a direction corresponding to the well azimuth; determine a reservoir entry point corresponding to a location at a depth of the top limiting surface directly below the reservoir entry location; determine a reservoir exit point corresponding to a location at a depth of the bottom limiting surface directly below the reservoir exit location; and determine a well trajectory including: a main bore section extending from the reservoir entry location to the reservoir entry point; and a reservoir contact section extending from the reservoir entry location to the reservoir exit location, the reservoir contact section being contained between the top limiting surface and the bottom limiting surface, and the reservoir contact section including a series of well trajectory points from the reservoir entry location to the reservoir exit location, each of the well trajectory points located at a depth that is proportionally closer to the bottom limiting surface than the top limiting surface than any preceding well trajectory points of the series that are closer to the reservoir entry location such that the well trajectory includes a path that extends downward gradually from the top limiting surface to the bottom limiting surface; and generate a field development plan (FDP) for the hydrocarbon reservoir, the FDP including development information for each well of the plurality of wells, the development information for each well including the determined well trajectory for the well.

In certain embodiments, a depth for each point of the series of well trajectory points of the reservoir contact section of the well trajectory for each well is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0.

In some embodiments, the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

In some embodiments, the system is further adapted to identify the plurality of wells proposed to be drilled into the hydrocarbon reservoir, wherein identify the plurality of wells proposed to be drilled into the hydrocarbon reservoir includes: determine a polygon defining an area of interest for the FDP; and identify a first plurality of wells proposed to be drilled into the hydrocarbon reservoir, wherein identify the plurality of wells proposed to be drilled into the hydrocarbon reservoir includes identifying wells of the first plurality of wells that fall within the polygon.

In certain embodiments, identifying the plurality of wells proposed to be drilled into the hydrocarbon reservoir further includes: determine locations of existing well-sites; and identify any wells of the a first plurality of wells proposed to be drilled into the hydrocarbon reservoir having a proposed well location that is within a threshold well distance of any of the existing well-sites, wherein identifying the plurality of wells proposed to be drilled into the hydrocarbon reservoir includes excluding any wells of the a first plurality of wells proposed to be drilled into the hydrocarbon reservoir determined to have a proposed well location that is within a threshold well distance of any of the existing well-sites.

In some embodiments, the system is further adapted to: determine a location of one or more geographic features of the hydrocarbon reservoir; determine a threshold geographic feature distance associated with the FDP; and for each well of the plurality of wells proposed to be drilled into the hydrocarbon reservoir: determine whether one or more points of the well trajectory for the well are located within the threshold geographic feature distance of the location of one or more geographic features; and in response to determining that one or more points of the well trajectory for the well are located within the threshold geographic feature distance of the location of the one or more geographic features, remove the one or more points from the well trajectory for the well. In certain embodiments, remove the one or more points of the well trajectory for the well includes: remove the one or more points of the well trajectory for the well determined to be located within the threshold geographic event distance of the location of one or more geographic features; and remove any well trajectory points of the series of well trajectory points that are closer to the reservoir exit point than the one or more points of the well trajectory for the well determined to be located within the threshold geographic event distance of the location of one or more geographic events.

In some embodiments, the system is further adapted to: determine locations of well trajectories of the plurality of the well trajectories for each well of a plurality of wells proposed to be drilled into the hydrocarbon reservoir and well trajectories for any existing wells; determine a threshold well trajectory distance associated with the FDP; for each well of the plurality of wells proposed to be drilled into the hydrocarbon reservoir: determine whether one or more points of the well trajectory for the well are located within the threshold well trajectory distance of locations of well trajectories of the plurality of the well trajectories for each well of a plurality of wells proposed to be drilled into the hydrocarbon reservoir and well trajectories for any existing wells; and in response to determining that one or more points of the well trajectory for the well are located within the threshold well trajectory distance of locations of well trajectories of the plurality of the well trajectories for each well of a plurality of wells proposed to be drilled into the hydrocarbon reservoir and well trajectories for any existing wells, remove the one or more points from the well trajectory for the well. In certain embodiments, remove the one or more points of the well trajectory for the well includes: remove the one or more points of the well trajectory for the well determined to be located within the threshold well trajectory distance of locations of well trajectories of the plurality of the well trajectories for each well of the plurality of wells proposed to be drilled into the hydrocarbon reservoir and the well trajectories for any existing wells; and remove any well trajectory points of the series of well trajectory points that are closer to the reservoir exit point than the one or more points of the well trajectory for the well determined to be located within the threshold well trajectory distance of locations of well trajectories of the plurality of the well trajectories for each well of the plurality of wells proposed to be drilled into the hydrocarbon reservoir and the well trajectories for any existing wells.

In some embodiments, the system is further adapted to: for each of the well trajectories: determine a well completion, the well completion including a perforation section extending across at least a portion of the reservoir contact section of the well trajectory.

In certain embodiments, the system is further adapted to: for each of the well trajectories: determine whether the well completion for the well trajectory satisfies predefined well criteria, the well criteria including minimum and maximum total well length and minimum and maximum accumulative perforation length; and in response to determining that the well completion for the well trajectory does not satisfy predefined well criteria, not including a well corresponding to the well trajectory in the FDP.

In some embodiments, the system is further adapted to: for each of the proposed wells of the FDP, calculate a corresponding oil-in-place for the well, wherein the oil-in-place is indicative of a production potential for the well, and wherein the oil in place for each well is determined based on the well trajectory determined for the well; and rank the plurality of wells of the FDP based on the oil-in-place calculated for the proposed wells of the FDP, wherein the FDP includes an indication of the ranking the plurality of wells based on the oil in place.

In certain embodiments, the system is further adapted to: rank the plurality of wells of the FDP; and serve, to a computer for display via a graphical user interface, a depiction of a ranking the plurality of wells, wherein the graphical depiction of the ranking the plurality of wells includes a geographical mapping including, for each well of the plurality of wells, an element depicted at a location corresponding to a geographical location of the well, wherein the element includes a length corresponding to a length of the well and a direction corresponding to an azimuth for the well, and wherein the element includes a color or pattern corresponding to the ranking of the well relative to the other wells of the plurality of wells. In some embodiments, each element includes an interactive element, and wherein, in response to receiving selection of the element, the system is further configured to display additional information for the well corresponding to the element.

Provided in some embodiments is a method for developing a hydrocarbon reservoir, The method including: determining a top limiting surface of a hydrocarbon reservoir; determining a bottom limiting surface of the hydrocarbon reservoir; for each well of a plurality of wells proposed to be drilled into the hydrocarbon reservoir: determining well parameters including: a proposed well location indicative of a surface location of the well; a well azimuth indicative of a direction of a borehole for the well; and a well length indicative of a horizontal distance for the well; determining a reservoir entry location at or near the proposed well location; determining a reservoir exit location located a distance from the reservoir entry location corresponding to the well length and in a direction corresponding to the well azimuth; determining a reservoir entry point corresponding to a location at a depth of the top limiting surface directly below the reservoir entry location; determining a reservoir exit point corresponding to a location at a depth of the bottom limiting surface directly below the reservoir exit location; and determining a well trajectory including: a main bore section extending from the reservoir entry location to the reservoir entry point; and a reservoir contact section extending from the reservoir entry location to the reservoir exit location, the reservoir contact section being contained between the top limiting surface and the bottom limiting surface, and the reservoir contact section including a series of well trajectory points from the reservoir entry location to the reservoir exit location, each of the well trajectory points located at a depth that is proportionally closer to the bottom limiting surface than the top limiting surface than any preceding well trajectory points of the series that are closer to the reservoir entry location such that the well trajectory includes a path that extends downward gradually from the top limiting surface to the bottom limiting surface; and generating a field development plan (FDP) for the hydrocarbon reservoir, the FDP including development information for each well of the plurality of wells, the development information for each well including the determined well trajectory for the well.

In certain embodiments, a depth for each point of the series of well trajectory points of the reservoir contact section of the well trajectory for each well is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0.

In some embodiments, the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

Provided in some embodiments is non-transitory computer readable storage medium including program instructions executable by a computer processor to cause the operations of the system and/or the method for developing a hydrocarbon reservoir described above.

BRIEF DESCRIPTION OF THE DRAWINGS

FIG. 6C is a diagram that illustrates a FDP well report for a set of wells of an FDP in accordance with one or more embodiments.

FIG. 6D is a diagram that illustrates a well cross-section diagram for a well in accordance with one or more embodiments.

FIG. 6E is a diagram that illustrates a ranking of wells (e.g., based on HCPV) of an FDP in accordance with one or more embodiments.

Figure 1A:
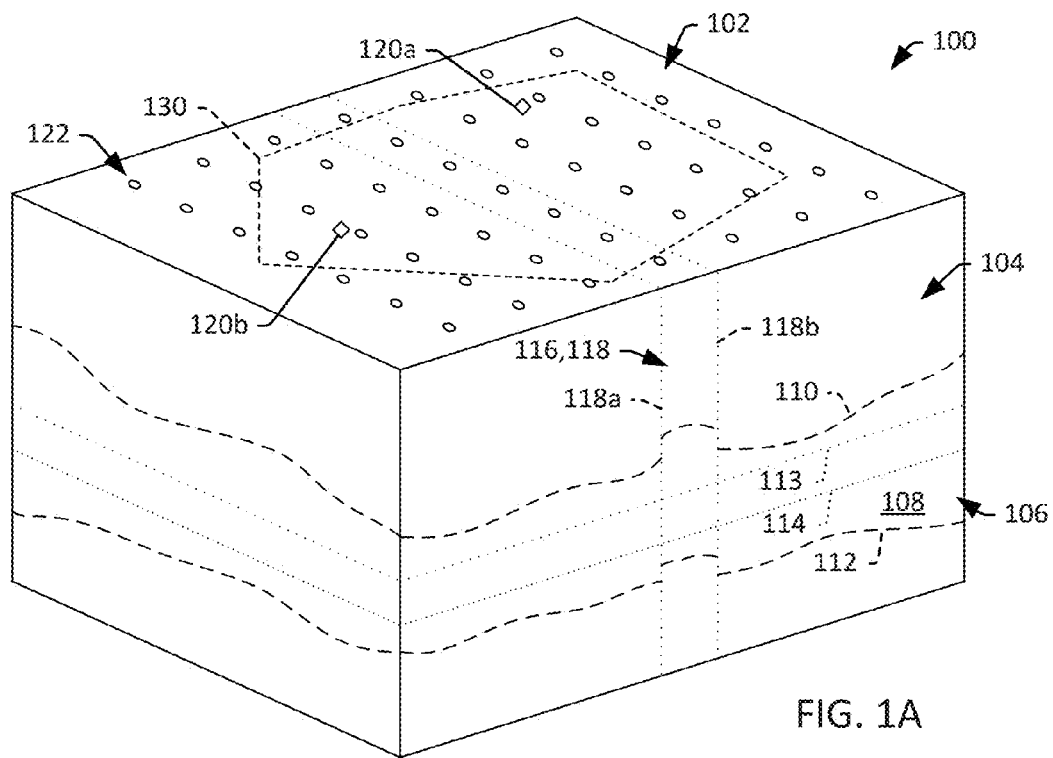
FIGS. 1A and 1B are diagrams that illustrate isometric views of a region including a subsurface hydrocarbon reservoir to be developed in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

The present invention will now be described more fully hereinafter with reference to the accompanying drawings in which example embodiments of the invention are shown. This invention may, however, be embodied in many different forms and should not be construed as limited to the illustrated embodiments set forth herein, rather, these example embodiments are provided so that this disclosure will be thorough and complete, and will fully convey the scope of the invention to those skilled in the art.

Described herein are systems and methods for developing hydrocarbon reservoirs, including generating and employing FDPs for developing hydrocarbon reservoirs. Certain embodiments provide for rapidly generating FDPs to optimize the production potential of a hydrocarbon reservoir, by for example, generating a set of proposed wells that maximize contact with a pay-zone of the reservoir. In some embodiments, an FDP can be generated based on little to no user input, while honoring the constraints of the reservoir and maximizing contact with a pay-zone of the reservoir. In some embodiments, trajectories for wells of the FDP are generated to include a reservoir contact section that extends from a first point at a top limiting surface of a pay-zone of the reservoir to second point a bottom limiting surface of the pay-zone of the reservoir. In some embodiments, the reservoir contact section follows a calculated path having a depth that is proportional to the difference between the top and bottom limiting surfaces and a function of location. Such a path can to maximize the trajectory's contact with the pay-zone. Further, the described embodiments can enable an FDP for a reservoir to be generated rapidly (e.g., within minutes or hours), thereby enabling any changes in parameters to be accounted for with little to no delay in generating an updated FDP and developing the reservoir. The ability to rapidly generate FDPs can enable developers to experiment with different sets of constraints prior to committing to a particular FDP—a luxury that was not available with existing techniques that can require weeks or months to develop a FDP. For example, employing the FDP generation techniques described herein, a developer can generate multiple FDPs based on different sets of constraints (e.g., within hours), review the FDPs, and select and employ a particular one of the FDPs that the developer believes will provide the best solution to develop the reservoir.

FIG. 1A is a diagram that illustrates an isometric view of a region 100 (including a hydrocarbon reservoir to be developed) in accordance with one or more embodiments. Although represented as a square (e.g., a cell) for the purpose of illustration, the region 100 may take any suitable shape. In some embodiments, the region 100 is defined by a portion of the earth's surface, referred to herein as the "surface" 102. In some embodiments, the region 100 includes the portion of the earth residing below the surface 102, including a subsurface formation 104. The subsurface formation 104 may include one or more subsurface hydrocarbon reservoirs (or "reservoirs") 106. A reservoir 106 may include a subsurface body of rock having sufficient porosity and permeability to store and transmit fluids, such as oil. In some embodiments, the reservoir 106 may include a pay-zone 108. The pay-zone 108 may refer to a portion of the reservoir 106 that is expected to contain economically producible hydrocarbons, such as gas and oil. The pay-zone 108 may be defined by a top limiting surface 110 and/or bottom limiting surface 112. A top limiting surface 110 may include or otherwise be defined by a three-dimensional (3D) contoured surface that represents a top surface (or "limit") of the pay-zone 108. A bottom limiting surface 112 may include or otherwise be defined by a three-dimensional contoured surface that represents a bottom surface (or "limit") of the pay-zone 108. In some embodiments, the region 100 includes a gas-oil contact surface 113. The gas-oil contact surface 113 may include or otherwise be defined by a three-dimensional contoured surface or a depth that represents a bounding surface or depth in the reservoir 106 above which predominantly gas occurs and below which predominantly oil occurs. In some embodiments, the region 100 includes a defined free water level (FWL) 114. The FWL 114 may be a depth at which the capillary pressure between water and oil is determined to be zero. Where the FWL is relatively constant across the region 100, the FWL 114 may be defined by a FWL value that is indicative of the FWL in the region 100. Where the FWL varies across the region 100 the FWL 114 may be defined by a 3D mapping of a contoured surface that represents the FWL 114 across the region 100.

In some embodiments, the top limiting surface 110 is an effective top limiting surface defined at least partially by the gas-oil contact surface 113. For example, respective portions of the top limiting surface 110 may be defined by the deeper of corresponding portions of a preliminary top limiting surface identified for the reservoir 106 and the gas-oil contact surface 113. In some embodiments, the bottom limiting surface 112 is an effective bottom limiting surface defined at least partially by the FWL 114 and/or the gas-oil contact surface 113. For example, respective portions of the bottom limiting surface 112 may be defined by the shallower of corresponding portions of a preliminary bottom limiting surface identified for the reservoir 106 and the FWL 114. Such an embodiment may be employed to maintain a reservoir contact section of the wellbore in the oil producing region of the reservoir 106 (e.g., in the region above the FWL 114). As another example, respective portions of the bottom limiting surface 112 may be defined by the shallower of corresponding portions of a preliminary bottom limiting surface identified for the reservoir 106 and the gas-oil contact surface 113. Such an embodiment may be employed to maintain a reservoir contact section of the wellbore in the gas producing region of the reservoir 106 (e.g., in the region above the FWL 114 and the portion of the reservoir 106 expected to contain oil).

Figure 1B:
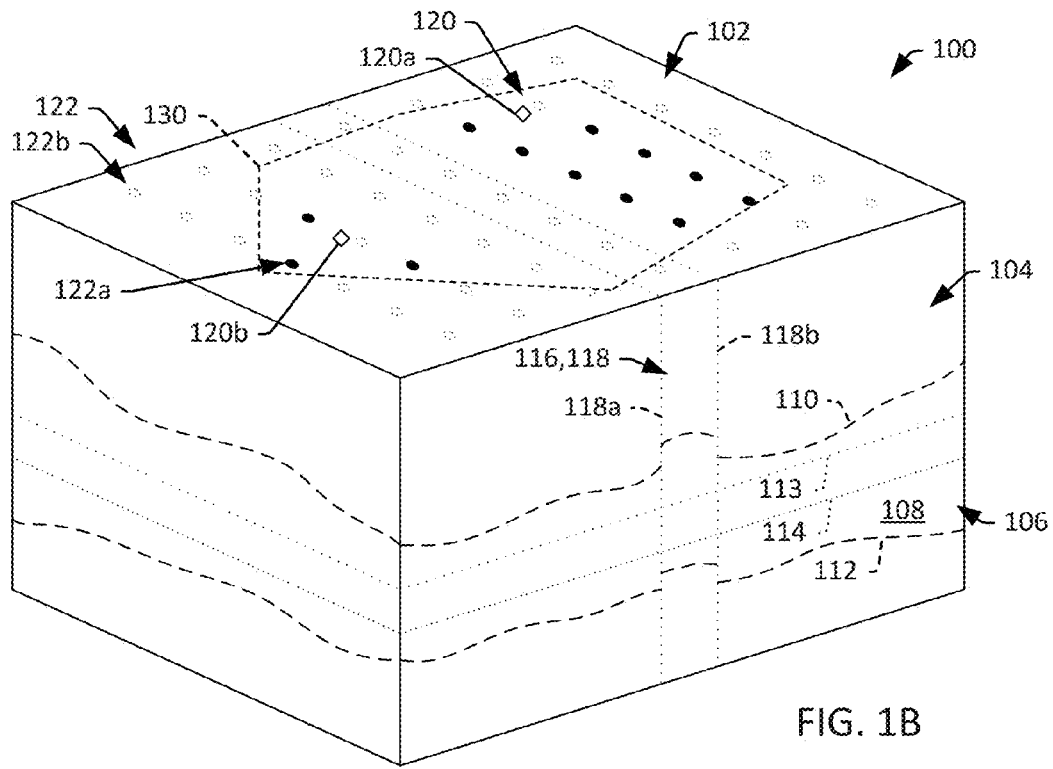
Figure 1C:
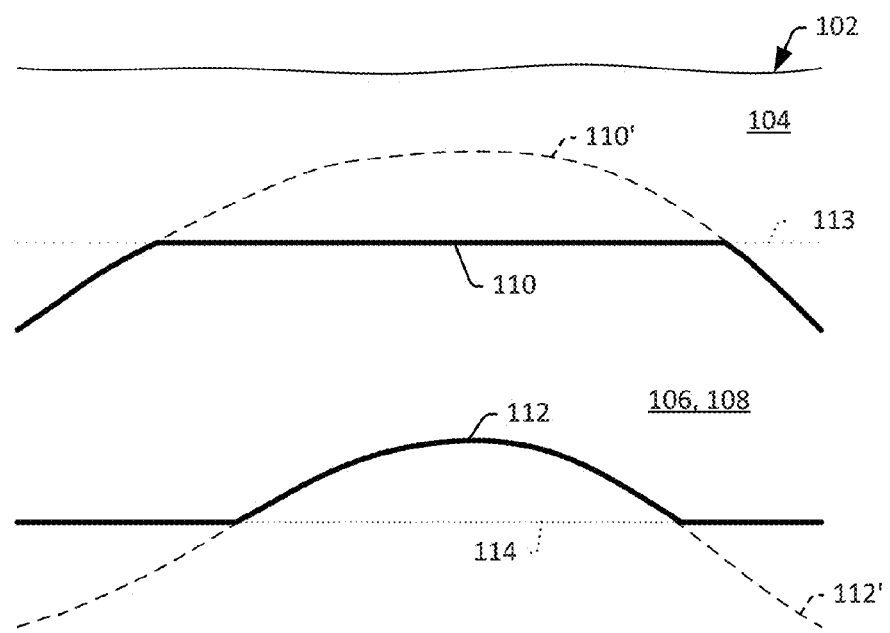
FIG. 1C is a diagram that illustrates an effective top limiting surface and an effective bottom limiting surface in accordance with one or more embodiments.

FIG. 1C is a diagram that illustrates a top limiting surface 110 and a bottom limiting surface 112 in accordance with one or more embodiments. In the illustrated embodiment, the top limiting surface 110 is an effective top limiting surface having respective portions thereof defined by the deeper of corresponding portions of a preliminary top limiting surface 110' identified for the reservoir 106 and the gas-oil contact surface 113. In the illustrated embodiment, the bottom limiting surface 112 is an effective bottom limiting surface having respective portions thereof defined by the shallower of corresponding portions of a preliminary bottom limiting surface 112' identified for the reservoir 106 and the FWL 114.

Returning to FIGS. 1A and 1B, in some embodiments, the region 100 includes geographic features (or "events") 116, such as a fault 118. A fault 118 may include a break in planar rock in which there is observable displacement, and may be represented by one or more fault planes. The illustrated embodiment includes fault planes 118a and 118b on either side of a fault block of the fault 118. In some embodiments, the region 100 includes one or more existing well sites 120 (e.g., well sites 120a and 120b represented by diamonds on the surface 102 of FIG. 1). An existing well site 120 may include a location on the surface 102 (e.g., defined by latitude and longitude coordinates) where a well has already been drilled or is already planned to be drilled (e.g., a well drilled, completed or planned prior to generation of the current FDP for the reservoir 106). In some embodiments, an existing well site 120 includes an associated borehole and/or completions along a wellbore trajectory, a planned well trajectory and/or planned completions (e.g., planned locations for perforation sections) associated therewith. In some embodiments, the region 100 includes proposed well locations (or "proposed well sites") 122 (e.g., proposed well locations 122 represented by circles on the surface 102 of FIG. 1A). A proposed well site 122 may include a location on the surface 102 (e.g., defined by latitude and longitude coordinates) where a well is proposed to be drilled (e.g., based on an FDP). In some embodiments, an area of interest 130 within the region 100 is defined. The area of interest 130 may include a polygon that defines boundaries of an area for a field of wells for developing the reservoir 106. The area of interest 130 may be defined on the surface 102 by a 2D polygon and/or may extend downward into the subsurface formation 104 (e.g., to define an elongated 3D volume having a cross-sectional shape corresponding to the shape of the 2D polygon).

As described herein an FDP with proposed wells can be generated to assist in developing the reservoir 106. In some embodiments, generating the FDP can include can identifying proposed well locations 122 that do not meet criteria for the FDP and removing them from consideration in the FDP. For example, where constraints for an FDP require that all well locations for a field are located within the area of interest 130, are located at least a threshold distance from exiting well sites 122, and are located at least a threshold distance from geographic features 116 (such as faults 118), proposed well locations that do not meet these criteria may be removed from consideration in the FDP. Referring to FIG. 1B, for example, proposed well locations 122 that are located outside of the area of interest 130, within a threshold distance of the fault planes 118a and 118b of fault 118, and/or within a threshold distance of one or more of the existing well sites 120a and 120b, are removed. In accordance with this example, there may be twelve remaining proposed well locations 122a (represented in FIG. 1B by solid circles, and thirty-seven removed proposed well locations 122b (represented in FIG. 1B by circles of dotted lines). In some embodiments, generation of the FDP includes model each of the remaining proposed wells 122a. This can include, for example, generating well trajectories that maximize contact with the reservoir 106 (e.g., include a reservoir contact section that extends from a first point at a top limiting surface 110 of the pay-zone 108 of the reservoir 106 to second point a bottom limiting surface 112 of the pay-zone 108 of the reservoir 106), completions along the well trajectory (e.g., perforation locations along the reservoir contact section), and/or the like. In some embodiments, generation of the FDP includes additional quality checks, such as checking that the generated wells meet additional quality criteria. This can include, for example, checking that each well trajectory and well completion features satisfy a minimum distance from other well trajectories, a minimum distance from geographic features, maximum/minimum well lengths, maximum/minimum accumulative perforation lengths, and/or the like, and altering or removing portions of the well trajectory that do not satisfy the criteria, or removing the well from consideration in the FDP. In some embodiments, generation of the FDP includes determining well production potentials, ranking priorities of the wells, and/or the like. In some embodiments, the information may be presented in an efficient manner to facilitate quick and accurate assessment of the FDP. For example, a ranking of the proposed wells of the FDP may include a geographic mapping that includes, for each of the proposed wells of the FDP, an element depicted at a location corresponding to a geographic location of the well, where each of the elements has a length and a direction indicative of a length and a direction of a well trajectory for the well, and is of a color or pattern that is indicative of the ranking of the well relative to the other proposed wells.

Figure 2:
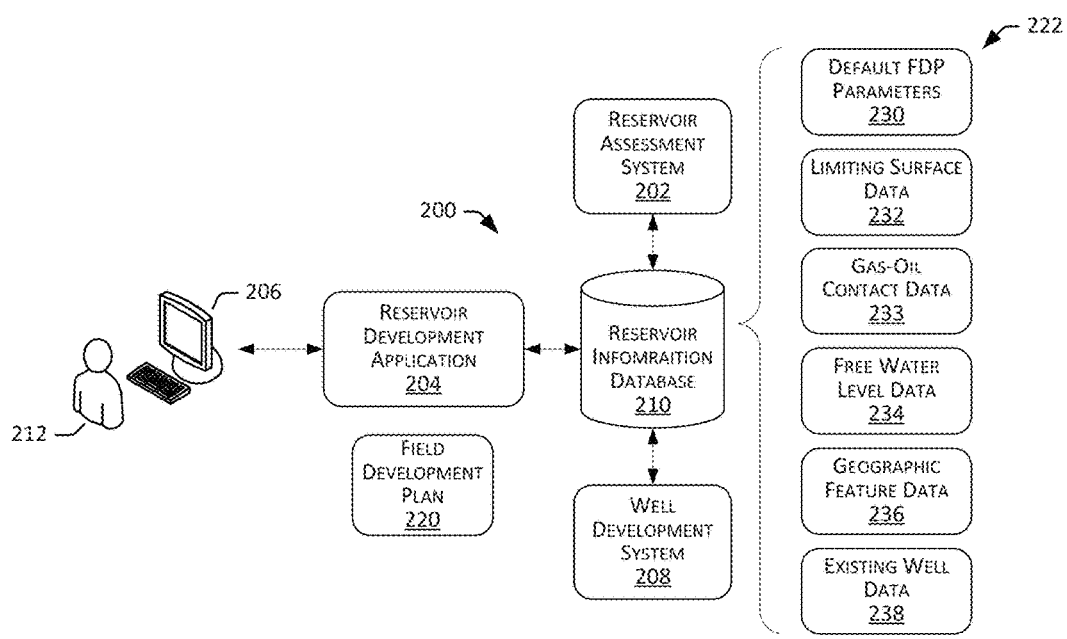
FIG. 2 is a diagram that illustrates a reservoir development environment in accordance with one or more embodiments.

FIG. 2 is a diagram that illustrates a reservoir development environment 200 in accordance with one or more embodiments. In some embodiments, the reservoir development environment 200 includes a reservoir assessment system 202, a reservoir development application 204, a FDP system 206, a well development system 208, and a reservoir information database 210. The FDP system 206 may be accessible by a user 212 (e.g., a geologist, geophysicists, engineer and/or the like tasked with developing the reservoir 106). In some embodiments, the reservoir development application 204 is executed on the FDP system 206 to generate a field development plan (FDP) 220 using reservoir information 222 (e.g., stored in the database 210), and the well development system 208 can be employed to develop a field of hydrocarbon wells (e.g., oil wells) in accordance with the FDP 220 in an effort to maximize the production potential of the reservoir 106.

In some embodiments, reservoir information 222 includes default FDP parameters 230, limiting surface data 232, gas-oil contact data 233, free water level (FWL) data 234, geographic feature data 236, exiting well data 238, and/or the like. In some embodiments, default FDP parameters 230 include default parameters for the FDP, such as, a default well length, a default well azimuth, a default sampling number, a default threshold geographic feature distance, a default threshold well trajectory distance, a default threshold well distance, a default minimum well length, a default maximum well length a default minimum accumulative perforation length, a default maximum accumulative perforation length and/or the like. As described herein, such default values may be employed for a parameter if, for example, an alternative value for the parameter is not specified (e.g., the user 212 does not specify a value for the parameter).

In some embodiments, the limiting surface data 232 is indicative of the locations of the top and/or bottom limiting surfaces for the region being developed. For example, referring to FIG. 1A, the limiting surface data 232 for the region 100 may include a 3D mapping of a contoured surface that represents the top limiting surface 110 of the pay-zone 108 of the reservoir 106 across the region 100, and a 3D mapping of a contoured surface that represents the bottom limiting surface 112 of the pay-zone 108 of the reservoir 106 across the region 100.

In some embodiments, the gas-oil contact data 233 is indicative of the gas-oil contact location for the region being developed. For example, referring to FIG. 1A, the gas-oil contact data 233 may include a gas-oil depth value that is indicative of the gas-oil contact surface 113 in the region 100 (e.g., where the gas-oil contact surface 113 is relatively constant across the region 100) and/or the gas-oil contact data 233 may include a 3D mapping of a contoured surface that represents the gas-oil contact surface 113 across the region 100 (e.g., where the gas-oil contact surface 113 varies across the region 100).

In some embodiments, the FWL data 234 is indicative of the FWL for the region being developed. For example, referring to FIG. 1A, the FWL data 234 may include a FWL depth value that is indicative of the FWL in the region 100 (e.g., where the FWL is relatively constant across the region 100) and/or the FWL data may include a 3D mapping of a contoured surface that represents the FWL 114 across the region 100 (e.g., where the FWL varies across the region 100).

In some embodiments, the geographic feature data 236 is indicative of one or more geographic features in the region being developed. For example, referring to FIG. 1A, the geographic feature data 236 may include an indication of the location the geographic features 116 in the region, such as the fault 118. The geographic feature data 236 may include for example, a 3D mapping of contoured surfaces that represent the fault planes 118a and 118b, respectively, across the region 100.

In some embodiments, the existing well data 238 is indicative of one or more features of existing wells in the region being developed. For example, referring to FIG. 1A, the existing well data 238 may include, for each of the existing well sites 120a and 120b, a well site surface location (e.g., a location on the surface 102, defined by latitude and longitude coordinates), associated well bore data (e.g., a wellbore trajectory and completions data, such as locations of perforation sections for the existing well site), and/or the like.

In some embodiments, the reservoir assessment system 202 provides at least some of the reservoir information 210. For example, the reservoir assessment system 202 may include seismic system and/or a logging system that generates some or all of the limiting surface data 232, the gas-oil contact data 233, the free water line data 234, the geographic feature data 236, and/or the like. For example, a seismic system may conduct seismic testing of the region 100 to generate field seismic data for the region 100 and the hydrocarbon reservoir 106, and/or a logging system may conduct logging of one or more existing wells in the of the region 100 to generate log data for the region 100 and the hydrocarbon reservoir 106. The reservoir assessment system 202 may generate a geologic mapping of the region 100 (e.g., including the hydrocarbon reservoir 106) using the field seismic data and the log data for the region 100. The geologic mapping may include a subsurface mapping that includes the limiting surface data 232 for the region 100 (e.g., including a 3D mapping of a contoured surface that represents the top limiting surface 110 of the pay-zone 108 of the reservoir 106 across the region 100, and a 3D mapping of a contoured surface that represents the bottom limiting surface 112 of the pay-zone 108 of the reservoir 106 across the region 100), the gas-oil contact data 233 (e.g., including a gas-oil depth value that is indicative of the gas-oil contact surface 113 in the region 100 and/or a 3D mapping of a contoured surface that represents the gas-oil contact surface 113 across the region 100), the FWL data 234 (e.g., including a FWL depth value that is indicative of the FWL in the region 100 and/or a 3D mapping of a contoured surface that represents the FWL 114 across the region 100), the geographic feature data 236 (e.g., including a 3D mapping of contoured surfaces that represent the fault planes 118a and 118b, respectively, across the region 100) and/or the like. In some embodiments, the limiting surface data 232 for the top and bottom limiting surfaces is determined by integrating seismic data with well log data. For example, top and bottom reservoir pay-zone locations may be determined for each of a plurality of wells based on log data for the wells (e.g., determining top and bottom reservoir pay-zone locations corresponding to the depth at which the well bore enters and exits, respectively, the pay-zone 108 based on log data for the well). In turn, a top limiting surface 110 may be determined as a 3D contour that includes or otherwise corresponds to the top locations at the respective well locations and/or a bottom limiting surface 112 may be determined as a 3D contour that includes or otherwise corresponds to the bottom locations at the respective well locations. In some embodiments, the portions of the top and/or bottom limiting surfaces 110 and 112 that extend between the well locations can be determined via interpolation between the tops and/or bottoms at the well locations and/or based on seismic data for the areas between the wells. Limiting surfaces indicative of upper and lower limits of hydrocarbon (e.g., gas or oil) pay-zones 108 may be determined using well data, such as MDT (modular formation dynamics tester) and well logs. Surfaces indicative of upper surfaces of water zones (e.g., a FWL) may be determined using well data, such as modular formation dynamics tester (MDT), production logging tool (PLT), and saturation well logs. Fault planes (e.g., fault planes 118a and 118b) may be determined via seismic data interpretation. The reservoir assessment system 202 may store the generated reservoir information 222 in the database 210 for use by the reservoir development application 204.

In some embodiments, the reservoir development application 204 is executed on a computer to generate one or more FDPs 120 based on the reservoir information 222, and/or FDP parameters provided by a user 212. For example, the FDP system 206 may include a computer system, and the reservoir development application 204 may be executed on the FDP system 206 to generate one or more FDPs 120 based on the reservoir information 222, and/or FDP parameters provided by the user 212. The FDP system 206 may include, for example, a computer system that is the same or similar to the computer system 1000 described herein with regard to at least FIG. 8. As described herein the reservoir development application 204 may obtain, from the reservoir information database 210, the default FDP parameters 230, the reservoir information 222 (e.g., including the limiting surface data 232 for the region 100, the gas-oil contact data 233, the FWL data 234 for the region 100, the geographic feature data 236, and the exiting well data 238) and/or user specified FDP parameters (e.g., a specific well site spacing, a well length, a well azimuth, a sampling number, a threshold geographic feature distance, a threshold well trajectory distance, a threshold well distance, and/or the like specified by the user 212 via the FDP system 206). The reservoir development application 204 may, for each of a plurality of hydrocarbon wells to be drilled into the hydrocarbon reservoir, perform the following operations: (1) determine: (i) a proposed well location indicative of a surface location of the well; (ii) a well azimuth indicative of a direction of a borehole for the well; and (iii) a well length indicative of a horizontal distance for the well; (2) determine a reservoir entry location at or near the proposed well location; (3) determine a reservoir exit location located a distance from the reservoir entry location corresponding to the well length and in a direction corresponding to the well azimuth; (4) determine a reservoir entry point corresponding to a location at a depth of the top limiting surface directly below the reservoir entry location; (5) determine a reservoir exit point corresponding to a location at a depth of the bottom limiting surface directly below the reservoir exit location; and (6) determine a well trajectory having a reservoir contact section: (i) having a main bore section extending from the reservoir entry location to the reservoir entry point extending from the reservoir entry location and the reservoir exit location; and (ii) a reservoir contact section extending from the reservoir entry location to the reservoir exit location, where the reservoir contact section is contained between the top limiting surface (e.g., the top limiting surface 110 of the pay-zone 108) and the bottom limiting surface (e.g., the bottom limiting surface 112 of the pay-zone 108); and (7) generate a FDP for the hydrocarbon reservoir, including development information for each well of the plurality of wells (e.g., the determined well trajectory for each well in the FDP). With regard to the well trajectory, the reservoir development application 204 may determine the reservoir contact section of the well trajectory to include a series of well trajectory points from the reservoir entry location to the reservoir exit location, each of the well trajectory points located at a depth that is proportionally closer to the bottom limiting surface than the top limiting surface than any preceding well trajectory points of the series that are closer to the reservoir entry location, such that the well trajectory includes a path that extends downward gradually from the top limiting surface to the bottom limiting surface. As described herein, in some embodiments, a depth for each point of the series of well trajectory points of the reservoir contact section of the well trajectory for each hydrocarbon well is determined using the following relationship:

$$Z_{(X,Y)} = D_{(X,Y)} \times \left(\frac{n}{N-1}\right) + Z_{top,(X,Y)} \quad (1)$$

where $Z_{(X,Y)}$ is a depth of well trajectory point located directly below a surface location (X,Y), $Z_{top,(X,Y)}$ is the depth of the top limiting surface directly below the surface location (X,Y), $D_{(X,Y)}$ a distance between the top limiting surface (e.g., the top limiting surface 110 of the pay-zone 108) and the bottom limiting surface (e.g., the bottom limiting surface 112 of the pay-zone 108) directly below the surface location (X,Y), N is a total number of points in the series of well trajectory points (e.g., a specified "sampling"), and n is the index in the series of points with the reservoir entry point being the first point in the series and having an index of 0. The values of X and Y may be, for example, the geographic coordinates (e.g., latitude and the longitude, respectively) of the surface location.

In some embodiments, generation of the FDP 220 includes performing quality checks to ensure that the wells and associated well trajectories are not too close to other objects or features. For example, the reservoir development application 204 may: (1) remove a proposed well if the associated well location is located within a threshold well distance of the location of any existing well sites; (2) alter the well trajectory for a proposed well if the well trajectory is located within a threshold well distance of a well trajectory of an existing well or other proposed wells (e.g., truncating the well trajectory at the first offending position along the proposed well trajectory); (3) alter the well trajectory for a proposed well if the well trajectory is located within a threshold geographic feature distance of a geographic feature, such as a fault (e.g., truncating the well trajectory at the first offending position along the proposed well trajectory); (4) not include a proposed well in the FDP if it does not satisfy predefined well criteria (e.g., a minimum/maximum total well length and/or a minimum/maximum accumulative perforation length).

In some embodiments, the generation of the FDP 220 includes determining associated reportings. For example, the reservoir development application 204 may, for each of the proposed wells of the FDP 220, calculate a corresponding reservoir opportunity index (ROI) and rank the proposed well of the FDP. The ROI for a well may be based on an oil-in-place for the well that is indicative of a production potential for the well based on its associated well trajectory. The ranking of the wells of the FDP 220 can be based on a variety of metrics, such as the ROI. The ROI for the wells of the FDP 220 and/or the raking of the wells may be provided in or with the FDP 220.

In some embodiments, the FDP 200 and associated information may be presented in a manner to facilitate quick and accurate assessment of the FDP 220. For example, the reservoir development application 204 may generate (for display to the user 112) a ranking of the proposed wells of the FDP 220 that includes a geographic mapping that includes, for each of the proposed wells of the FDP 220, an element (e.g., an icon) depicted at a location corresponding to a geographic location of the well, where each of the elements has a length and a direction indicative of a length and a direction of a well trajectory for the well, and is of a color or pattern that is indicative of the ranking of the well relative to the other proposed wells (see, e.g., FIG. 7).

Figure 3:
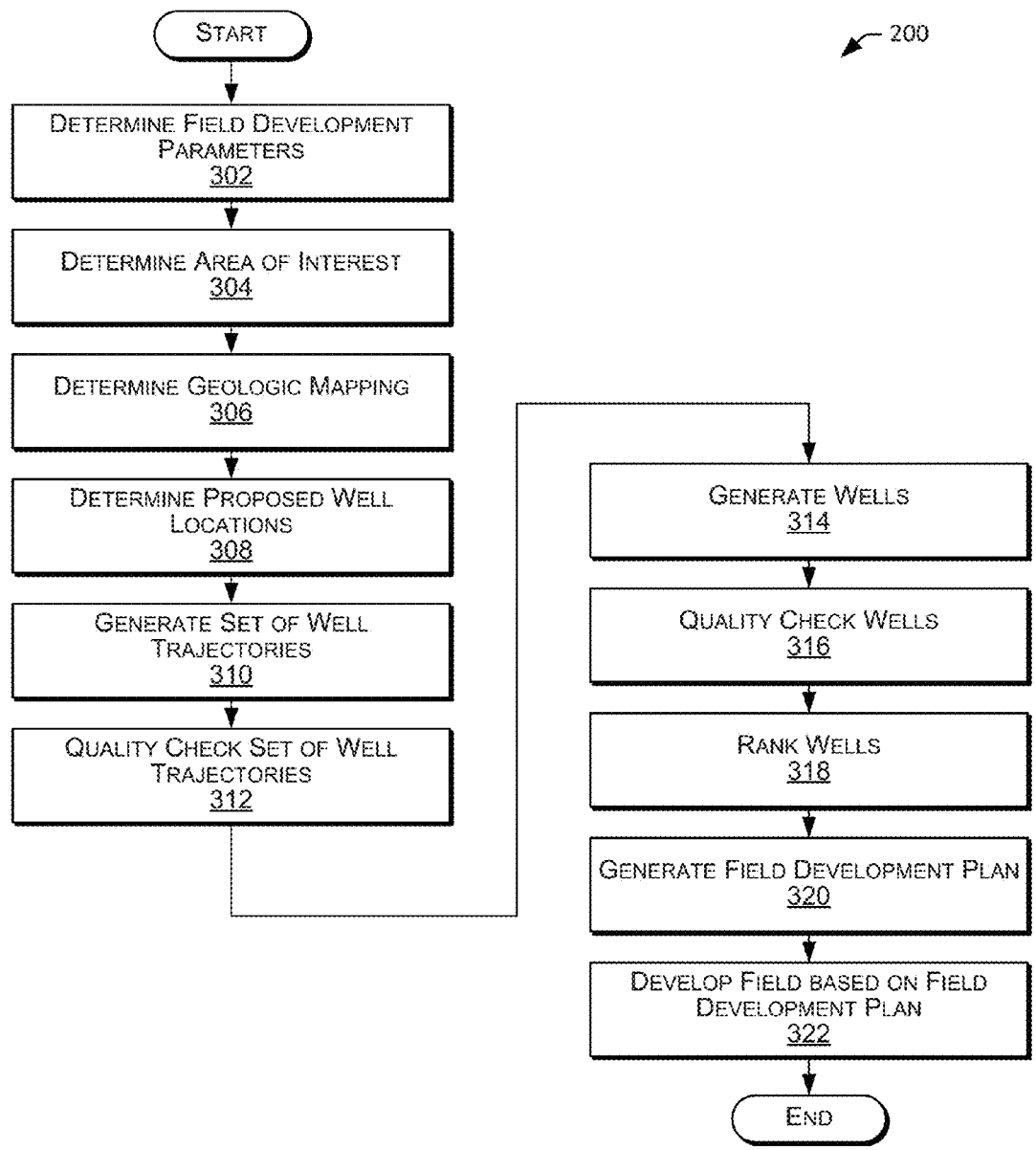
FIG. 3 is a flowchart diagram that illustrates a method for developing a reservoir in accordance with one or more embodiments.

FIG. 3 is a flowchart diagram that illustrates an example method 300 for developing a reservoir in accordance with one or more embodiments. The method 300 may include determining field development parameters (block 302). In some embodiments, determining field development parameters includes determining some or all of the field development parameters for developing an FDP 220. The field development parameters may include, for example, an area of interest (e.g., a polygon), a well site spacing (e.g., in X and Y directions), a well length, a well azimuth, a threshold geographic feature distance, a threshold well trajectory distance, a threshold well distance, a definition of an FWL, a definition of a top limiting surface, a definition of a bottom limiting surface, locations of existing well sites, definitions of geographic features (e.g., fault planes) and/or the like. In some embodiments, some or all of the FDP parameters may be provided by a user and/or determined from default FDP parameters. For example, the reservoir development application 204 may cause the FDP system 206 to query the user 212 to enter some or all of an area of interest defining the field boundaries, a well site spacing, a well length, a well azimuth, a threshold geographic feature distance, a threshold well trajectory distance, a threshold well distance, a definition of an FWL, a definition of a top limiting surface, a definition of a bottom limiting surface, locations of existing well sites, definitions of geographic features (e.g., fault planes) and/or the like for the region 100. In response to the query, the user 212 may specify some of all of the area of interest defining the field boundaries (e.g., via drawing a polygon defining the binaries on a surface map), a well site spacing (e.g., 1000 m in X direction and 1000 m in Y direction), a well length (e.g., 5,000 m), a well azimuth (e.g., 45°), a threshold geographic feature distance (e.g., 500 m), a threshold well trajectory distance (e.g., 500 m), a threshold well distance (e.g., 500 m), a definition of an FWL (e.g., by specifying a FWL value of 1000 m for the region or by specifying a location of a file defining a 3D mapping of a contoured surface that represents the FWL 114 across the region 100), a definition of the top limiting surface 110 (e.g., by specifying a location of a file defining a 3D mapping of a contoured surface that represents the top limiting surface 110), a definition of a bottom limiting surface (e.g., by specifying a location of a file defining a 3D mapping of a contoured surface that represents the bottom limiting surface 112), locations of existing well sites (e.g., by specifying latitude and longitude coordinates of existing wells 122a and 122b and/or their associated well trajectories and/or by specifying a location of a file defining latitude and longitude coordinates of the existing wells 122a and 122b and/or their associated well trajectories), definitions of geographic features (e.g., by specifying a location of a file defining a 3D mapping of contoured surfaces that represent the fault planes 118a and 118b), and/or the like.

In some embodiments, the reservoir development application 204 determines default values for the FDP parameters that are not specified by the user 212 in response to the query. For example, if the user 212 fails to specify a well length, the reservoir development application 204 may access the default FDP parameters 230 stored the reservoir information database 210, and determine the well length to be the default well length value (e.g., 5000 m) of the default FDP parameters 230. As a further example, if the user fails to specify an area of interest, the entire field may be used as the area of interest, by default. In some embodiments, the user 212 may be required to specify at least certain parameters. For example, the reservoir development application 204 may require the user 212 to specify one or more well locations, or at least a well site spacing (e.g., the user 212 can specify 1000 m in X direction and 1000 m in Y direction). In some embodiments, where the user 212 fails to specify a parameter that is unique to the area of interest 130 specified (e.g., a FWL, a top limiting surface, a bottom limiting surface, a geographic feature, and/or the like), the reservoir development application 204 may determine the parameter based on reservoir information 222 for the area of interest 130. For example, if the user 212 specifies only the area of interest 130 that falls within the region 100, the reservoir development application 204 may retrieve, from the reservoir information database 210, limiting surface data 232, gas-oil contact data 233, FWL data 234 and geographic feature data 236 for the region 100, and determine, from the data retrieved, a subsurface mapping that includes a value for the FWL in the region 100 (e.g., 100 m) and/or a 3D mapping of a contoured surface that represents the FWL 114 across the region 100, a 3D mapping of a contoured surface that represents the top limiting surface 110 of the pay-zone 108 of the reservoir 106 across the region 100, a 3D mapping of a contoured surface that represents the bottom limiting surface 112 of the pay-zone 108 of the reservoir 106 across the region 100, and a 3D mapping of contoured surfaces that represent the fault planes 118a and 118b across the region 100.

The method 300 may include determining a geographic area of interest (block 304). In some embodiments, determining a geographic area of interest includes the reservoir development application 204 determining an intersection of an area of interest specified by the user with the earth's surface. Referring to FIG. 1, for example, determining a geographic area of interest may include the reservoir development application 204 determining an intersection of the area of interest 130 (e.g., the polygon specified by the user 212) with the surface 102 of the region 100. The geographic area of interest 130 may define an area in which proposed well locations are allowed to be developed for the FDP 220. The area of interest 130 may be defined on the surface 102 by a 2D polygon and/or may extend downward into the subsurface formation 104 (e.g., to define an elongated 3D volume having a cross-sectional shape corresponding to the shape of the 2D polygon). Such a 3D area of interest 130 may define the volume in which well trajectories can be created for proposed wells of the FDP 220. That is, in some embodiments, proposed wells for the FDP 220 may not be located on portions of the surface 102 outside of the 2D polygon of the area of interest 130, and well trajectories for proposed wells of the FDP 220 may not be allowed to extend beyond the 3D boundary of the elongated 3D volume corresponding to the area of interest 130.

The method 300 may include determining a geologic mapping (block 306). In some embodiments, determining a geologic mapping includes determining a geologic mapping of the area of interest 130 and/or the region 100 containing the area of interest 130. Referring to FIG. 1, for example, determining a geologic mapping may include the reservoir development application 204 generating a 3D geologic mapping that includes representations of the top limiting surface 110, the bottom limiting surface 112, the free water level 114, the geographic features (e.g., fault planes 118a and 118b), existing well sites (e.g., well sites 210a and 120b) and/or the like for the area of interest 130 and/or the region 100.

The method 300 may include determining proposed well locations (block 308). In some embodiments, determining proposed well locations includes determining well locations in the area of interest 130 (e.g., located in the 2D polygon) that correspond to the user specified (or default) well locations and/or well spacing. If, for example, the user 212 specifies latitude and longitude coordinates for proposed well locations for wells within the region 100 and/or the area of interest 130, then the reservoir development application 204 may determine an initial set of proposed well location corresponding to the locations specified by the user 212. If the user 212 does not specify proposed well locations, but does specify a well spacing, then the reservoir development application 204 may determine an initial set of proposed well locations corresponding to the well spacing specified by the user 212. For example, if the user 212 specifies a well spacing of 1000 m in X direction and 1000 m in Y direction, then the reservoir development application 204 may determine the grid of forty-nine initial proposed well locations 122 in the region 100 and equally spaced 1000 m in X direction and 1000 m in Y direction. Referring to FIG. 1, for example, if a well spacing of 1000 m in X direction and 1000 m in Y direction is specified, the reservoir development application 204 may determine the grid of forty-nine initial proposed well locations 122 in the region 100 and equally spaced 1000 m in X direction and 1000 m in Y direction. In some embodiments, determining proposed well locations includes removing any initially proposed well locations that fall outside of the area of interest. Referring to FIG. 1, for example, the reservoir development application 204 may remove all of the initially proposed well locations 122b that are located outside of the polygon defining the area of interest 130, to thereby generate a set of proposed well locations 122 that fall within the area of interest 130.

In some embodiments, determining proposed well locations includes checking to see if any of the proposed well locations are too close to any existing well locations. For example, in addition to removing any proposed well locations 122 that are located outside of the polygon defining the area of interest 130, the reservoir development application 204 may remove any initially proposed well locations 122 that are within a threshold well distance of any existing well sites 120. Referring to FIGS. 1A and 1B, for example, if the reservoir development application 204 has received, e.g., from the user 212, an indication to enforce constraints regarding proximity of existing well-sites, then the reservoir development application 204 may remove the two proposed well locations 122 adjacent the existing wells 120a and 120b, respectively, based on the two proposed well locations 122 being located within the well threshold distance (e.g., 500 m) of the existing wells 120a and 120b, respectively, to thereby generate a revised set of proposed well locations 122 that fall within the area of interest 130 and are not too close to existing well-sites 120.

In some embodiments, determining proposed well locations includes checking to see if any of the proposed well locations are too close to any existing geographic features. For example, in addition to removing any proposed well locations 122 that are located outside of the polygon defining the area of interest 130 and/or too close to existing well locations, the reservoir development application 204 may remove any initially proposed well locations that are within a threshold geographic feature distance of any existing geographic features 116. Referring to FIGS. 1A and 1B, for example, if the reservoir development application 204 has received, e.g., from the user 212, an indication to enforce constraints regarding proximity of geographic features, then the reservoir development application 204 may remove the ten proposed well locations 122 adjacent the fault planes 118a and 118b, based on the ten proposed well locations 122 being located within the geographic feature threshold distance (e.g., 500 m) of the fault planes 118a and 118b, to thereby generate a revised set of proposed well locations 122 that fall within the area of interest 130, that are not too close to existing well-sites 120, and/or are not too close to existing geographic features 116 (e.g., fault 118).

The method 300 may include generating a set of well trajectories (block 310). In some embodiments, generating a set of well trajectories includes generating a well trajectory for each proposed well location 122 of the set of proposed well locations. Referring to FIG. 1B, for example, generating a set of well trajectories may include the reservoir development application 204 generating a well trajectory for each of the twelve proposed well locations 122a. In some embodiments, each well trajectory includes a reservoir contact section that includes a path that extends downward gradually from the top limiting surface 110 to the bottom limiting surface 112, through the pay-zone 108 of the reservoir 106, to maximize contact with the pay-zone 108 of the reservoir 106.

Figure 4:
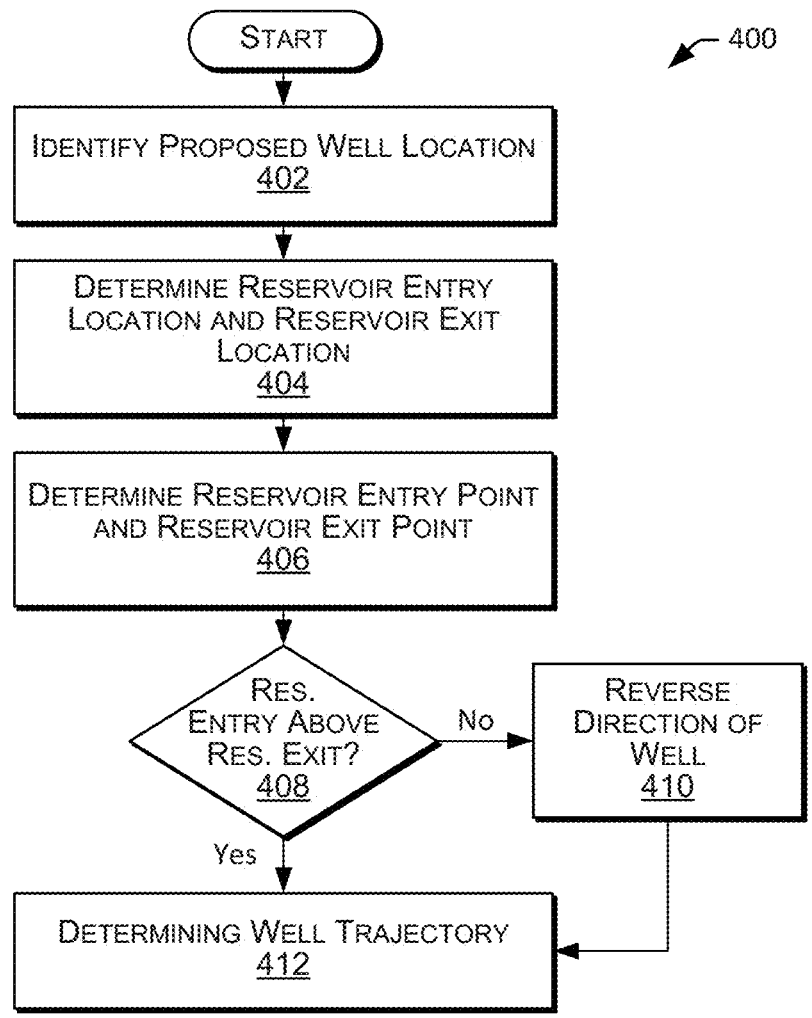
FIG. 4 is a flowchart diagram that illustrates a method for generating a well trajectory in accordance with one or more embodiments.

FIG. 4 is a flowchart diagram that illustrates an example method 400 for generating a well trajectory in accordance with one or more embodiments. Method 400 may include identifying a proposed well location (block 402). In some embodiments, identifying a proposed well location includes identifying a proposed well location 122 for one of the remaining proposed well locations 122a identified at block 308. Referring to FIG. 1B, for example, identifying a proposed well location may include the reservoir development application 204 identifying a first proposed well location 122 of the twelve remaining proposed well locations 122a.

Figure 5A:
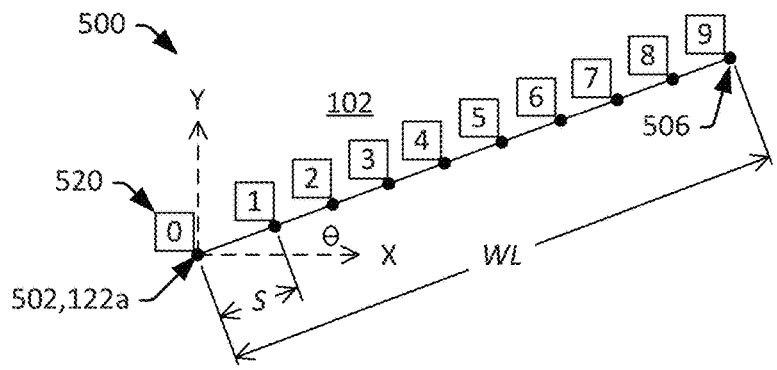
FIGS. 5A and 5B are diagrams that illustrate top and side views, respectively, of a well trajectory in accordance with one or more embodiments.
Figure 5B:
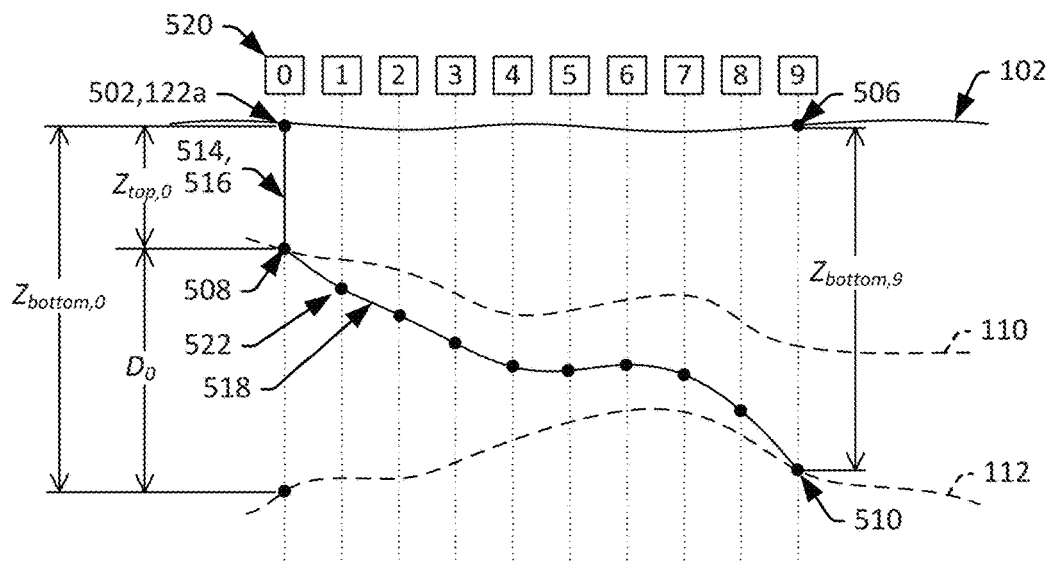

Method 400 may include determining a reservoir entry location and reservoir exit location (block 404). In some embodiments, the reservoir entry location is a 2D location (e.g., on the surface 102) that corresponds to the proposed well location 122. Referring to FIGS. 5A and 5B, for example, determining a reservoir entry location may include the reservoir development application 204 determining a reservoir entry location 502 to be the 2D geographic coordinates (e.g., latitude and longitude) of the proposed well location 122 identified at block 402. In some embodiments, the reservoir exit location is a 2D location (e.g., on the surface 102) that corresponds to a location that is the located a distance from the reservoir entry location corresponding to the well length (WL) and in a direction corresponding to the well azimuth (θ). Referring to FIGS. 5A and 5B, for example, determining a reservoir exit location may include the reservoir development application 204 determining the reservoir exit location to be the 2D geographic coordinates (e.g., latitude and longitude) of a reservoir exit location 504, located distance from a reservoir entry location 502 that corresponds to the well length (WL) and in a direction corresponding to the well azimuth (θ).

Method 400 may include determining a reservoir entry point and a reservoir exit point (block 406). In some embodiments, the reservoir entry point is a 3D location (or "point") that corresponds to a point at a depth ($Z_{top}$) of a top limiting surface directly below the reservoir entry location and/or the reservoir exit point is a 3D location (or "point") that corresponds to a point at a depth ($Z_{bottom}$) of a bottom limiting surface directly below the reservoir exit location. Referring to FIGS. 5A and 5B, for example, determining a reservoir entry point may include the reservoir development application 204 determining a reservoir entry point 508 to be the 3D geographic coordinates having an X coordinate equal to the latitude of the reservoir entry location 502, a Y coordinate equal to the longitude of the reservoir entry location 502, and a Z coordinate equal to the depth, $Z_{top,0}$. Determining a reservoir exit point may include the reservoir development application 204 determining a reservoir exit point 510 having an X coordinate equal to the latitude of the reservoir exit location 506, a Y coordinate equal to the longitude of the reservoir exit location 506, and a Z coordinate equal to the depth, $Z_{bottom,9}$.

Method 400 may include determining whether the reservoir entry point is above (e.g. shallower) than the reservoir exit point (block 408), and, if so, reversing the direction of the well (block 410). In some embodiments, determining a path for the well trajectory includes determining a path having a generally downward direction, such that the reservoir entry point is above the reservoir exit point. That is, the reservoir entry point is at a shallower depth than the reservoir exit point. If the reservoir entry point is at a shallower depth than the reservoir exit point, then the process may continue using the current reservoir entry point and the current reservoir exit point. If, however, the reservoir exit point is at a shallower depth than the reservoir entry point, then the process may swap the reservoir exit point with the reservoir entry point, such that the reservoir exit point becomes the reservoir entry point and the reservoir entry point becomes the reservoir exit point, and may move the proposed well location to the reservoir exit location. That is, the ends of the proposed well may be swapped. Referring to FIGS. 5A and 5B, for example, determining whether the reservoir entry point is above (e.g. shallower) than the reservoir exit point may include the reservoir development application 204 determining whether the reservoir entry point 508 has a depth ($Z_{top,0}$) that is less than the depth ($Z_{bottom,9}$) of the reservoir exit point 510. If so (as depicted in FIG. 5B), then no action may be taken with regard to reversing the direction of the well, and the process may proceed to block 412. If, however, the reservoir development application 204 determines that the reservoir entry point 508 has a depth ($Z_{top,0}$) that is greater than the depth ($Z_{bottom,9}$) of the reservoir exit point 510 (notably not the case in illustration of FIG. 5B, but discussed with regard to the elements FIG. 5B for the purpose of illustration), then the reservoir development application 204 may reverse the direction of the well, including moving the reservoir entry point 508 to the location of the reservoir exit point 510, moving the reservoir exit point 510 to the location of the reservoir entry point 512, moving the reservoir entry location 502 (and/or the proposed well location 122) to the reservoir exit location 506, and/or moving the reservoir exit location 506 to the reservoir entry location 502.

Method 400 may include determining a well trajectory (block 412). In some embodiments, a well trajectory may include a main bore section and a reservoir contact section. The main bore section may extend from a reservoir entry location (and/or the proposed well location) to a reservoir entry point. The reservoir contact section may extend from the reservoir entry point to the reservoir exit point. In some embodiments, determining a well trajectory for a proposed well includes determining a main bore section of the well trajectory that extends from the reservoir entry location for the well (and/or the proposed well location 122 for the proposed well) to the reservoir entry point for the well. Referring to FIGS. 5A and 5B, for example, determining a well trajectory 514 may include the reservoir development application 204 determining main bore section 516 of the well trajectory 514, that extends from the reservoir entry location for the well (and/or the proposed well location 122 for the proposed well) to the reservoir entry point 508.

In some embodiments, determining a well trajectory includes determining a reservoir contact section having a path that extends downward gradually from the top limiting surface to the bottom limiting surface. The path may include a number of trajectory points that are equally spaced horizontally (e.g., in the direction of the surface). As described herein, in some embodiments, a depth of each point of the series of well trajectory points of the reservoir contact section is determined using the relationship defined above in equation 1.

Referring to FIGS. 5A and 5B, for example, where a user specifies using a sampling number of ten (e.g., N=10), determining the well trajectory 514 may include the reservoir development application 204 determining a reservoir contact section 518, including determining a series of ten well trajectory locations 520 (e.g., locations 0 through 9) equally spaced (e.g., by a distance S=(N−1)/WL), with the first well trajectory location 520 being located at the reservoir entry location (e.g., the proposed well location 122) and the last well trajectory point 520 being located at the reservoir exit location 506. Further the reservoir development application 204 may determine a corresponding well trajectory point 522 (at a depth $Z_{(X,Y)}$) for each of the determined well trajectory locations 520. For example, the reservoir development application 204 may determine a first well trajectory point 522 (corresponding to well trajectory location 0) to be at the location of the reservoir entry point 508 based on the following:

$$Z_{(X_0,Y_0)} = D_{(X_0,Y_0)} \times \left(\frac{0}{10-1}\right) + Z_{top,(X_0,Y_0)} \qquad (2)$$

(e.g., where $X_0,Y_0$ are the coordinates for the first well trajectory location, 0), the reservoir development application 204 may determine a second well trajectory point 522 (corresponding to well trajectory location 1) to be at the location $(X_1,Y_1,Z_1)$ based on the following:

$$Z_{(X_1,Y_1)} = D_{(X_1,Y_1)} \times \left(\frac{1}{10-1}\right) + Z_{top,(X_1,Y_1)} \qquad (3)$$

(e.g., where $X_1,Y_1$ are the coordinates for the second well trajectory location, 1), and so forth for each of the ten trajectory locations, to determine the ten well trajectory points 522 for a reservoir contact section 518 of a well trajectory 514 for the proposed well location 122. In some embodiments, determining the well trajectory 514 may include the reservoir development application 204 combining the determined main bore section 516 and the determined reservoir contact section 518 to generate a contiguous well trajectory 514 that extends from the reservoir entry location 502 (e.g., the proposed well location 122) through the reservoir entry point 508, and gradually downward to the reservoir exit point 510.

Method 400 may be repeated for each of the proposed well locations 122 of the remaining proposed well locations 122 identified at block 308 to generate corresponding set of well trajectories for the for the proposed well locations 122 identified at block 308. Referring to FIG. 1B, for example, the reservoir development application 204 may repeat the process of method 400 for each of the twelve proposed well locations 122a to generate a corresponding set of well trajectories 514, including twelve well trajectories 514 determined for respective ones of the twelve proposed well locations 122a.

Referring to method 300 of FIG. 3, method 300 may include quality checking the set of well trajectories (block 312). In some embodiments, quality checking the set of well trajectories includes checking each well trajectory of the well trajectories generated to determine if any portion of the well trajectory violates proximity constraints for the FDP, such as a threshold geographic feature distance, threshold well trajectory distance, and/or the like, and/or taking steps to remediate the violation. For example, quality checking the set of well trajectories may include the reservoir development application 204 determining, for each well trajectory 514 of the twelve well trajectories 514 generated, whether any points along the well trajectory 514 are within the threshold geographic feature distance of a geographic feature 116 (e.g., the fault planes 118a and/or 118b), and/or whether any points along the well trajectory 514 are within the threshold well trajectory distance of a well trajectory of an existing well 120 or any of the other eleven well trajectories 122. In some embodiments, if any portion of a well trajectory violates the FDP constraints, then the well trajectory may be altered. If for example, the reservoir development application 204 determines that a well trajectory 514 having a length of 10,000 m is within the threshold geographic feature distance of a geographic feature 116 or within the well threshold trajectory distance of a well trajectory of an existing well 120 or any of the other eleven well trajectories 122 at a location of about 7,500 m along the well trajectory 514, then the reservoir development application 204 may alter the well trajectory 514.

In some embodiments, altering a well trajectory may include truncating the well trajectory. This may include removing a portion of the well trajectory violating the FDP constraints and/or the portions of the well trajectory that extend beyond the violating portion of the well trajectory. If for example, the reservoir development application 204 determines that a well trajectory 514 having a length of 10,000 m is within the threshold geographic feature distance of a geographic feature 116 or within the well threshold trajectory distance of a well trajectory of an existing well 120 or any of the other eleven well trajectories 122 at a location of about 7,500 m along the well trajectory 514, then the reservoir development application 204 may remove the portion of the well trajectory 514 from about 7,500 m to 10,000 m, effectively truncating the well trajectory to a length of about 7,500 m. In some embodiments, the resulting truncated well length is used in the determination as to whether or not the well falls within the minimum or maximum well length.

Method 300 may include generating wells (block 314). In some embodiments, generating wells includes generating wells based on the quality checked set of well trajectories. For example, generating wells may include the reservoir development application 204 generating a set of hydrocarbon wells, including, for each of the well trajectories 514 of the quality checked set of well trajectories, a completed well model, including a definition of a borehole extending along the length of the well trajectory 514 and/or a definition of completion features, such as a size and/or location of casing perforations across the reservoir contact section 518 of the well trajectory 514.

Method 300 may include quality checking wells (block 316). In some embodiments, quality checking wells includes quality checking that the generated wells satisfy FDP well constraints such as the minimum/maximum well length, the minimum/maximum accumulative perforation length, and/or the like. For example, quality checking wells may include the reservoir development application 204 determining, for each of the wells of the set of hydrocarbon wells generated (e.g., at block 314), whether the well length (e.g., the length of the well trajectory) falls within the minimum and maximum well length for the FDP, whether the length of the perforations in well (e.g., the length of the perforations in reservoir contact section 518 of the well trajectory 514) falls within the minimum and maximum accumulative perforation length for the FDP. In some embodiments, a well that does not satisfy the well constraints may be removed from the set of hydrocarbon wells generated. For example, if the reservoir development application 204 determines that a well violates one or both of the minimum/maximum well length, the minimum/maximum accumulative perforation length constraints, the reservoir development application 204 may remove the well from the set of hydrocarbon wells generated, such that the well is not included in the set of wells of the FDP ultimately generated.

Method 300 may include ranking wells (block 314). In some embodiments, ranking wells includes ranking the wells relative to one another based on a projected return on investment (ROI) determined for each of the wells. In some embodiments, a ROI for a well includes a value of oil-in-place for the well. For example, where the well is determined to traverse a portion of the reservoir that can produce 100,000 barrels of oil via the well, the reservoir development application 204 may determine the well to have projected ROI of 100,000 barrels of oil. Where a barrel of oil is estimated to have a value of $100, the reservoir development application 204 may determine the well to have projected ROI of $10,000,000. In some embodiments, a projected return on investment can take into account a cost for drilling and operating the well. For example, where the well includes a cost of $1,000,000 for and drilling and operating the well, the reservoir development application 204 may determine the well to have projected ROI of $9,000,000. In some embodiments, the ROI can be expressed as a ratio. For example, where the well includes a cost of $1,000,000 for and drilling and operating the well, the reservoir development application 204 may determine the well to have projected ROI of 9 (e.g., ROI=$9,000,000/$1,000,000). The reservoir development application 204 may rank the wells of the set of wells relative to one another based on their respective ROI. In some embodiments, a priority can be assigned based on the ranking. For example, in a set of twelve wells, the wells may be assigned a priority of 1 to 12, corresponding to their ranking. A priority may indicate an order in which the wells should be drilled. For example, the highest priority well may be drilled first in accordance with an associated FDP. Although raking/prioritizing based on ROI is discussed for the purposed of illustration, rakings/priorities can be based a variety of different well characteristics for wells, such as Hydrocarbon Pore Volume (HCPV), formation permeability KH) and/or the like.

Figure 6A:
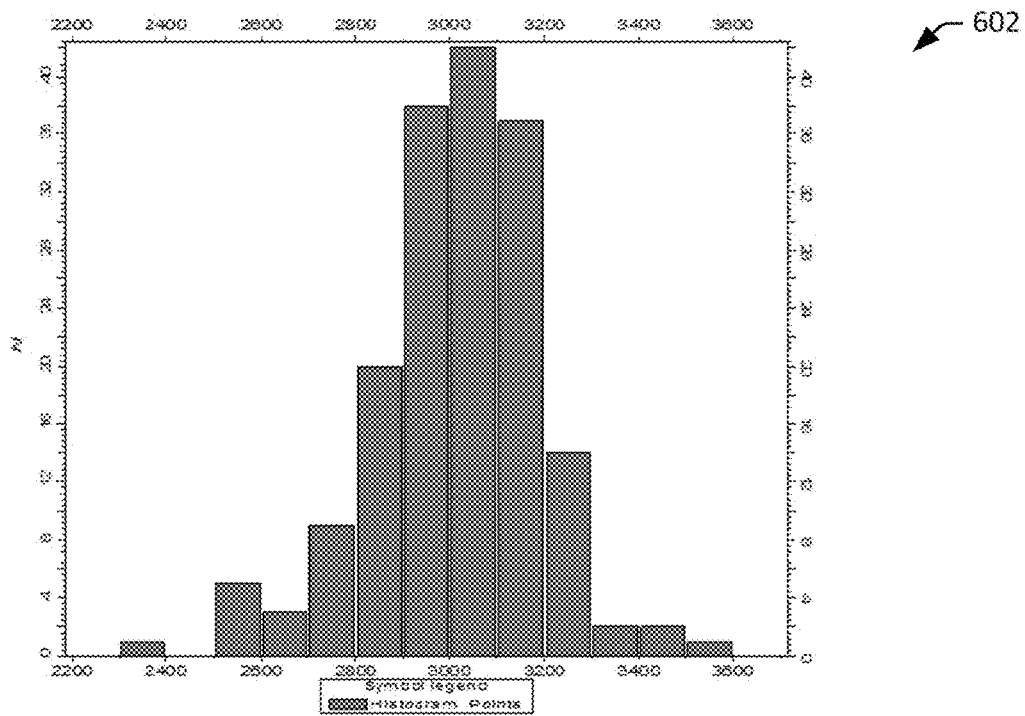
FIG. 6A is a diagram that illustrates an example histogram of well lengths of wells of a set of wells of an FDP in accordance with one or more embodiments.
Figure 6B:
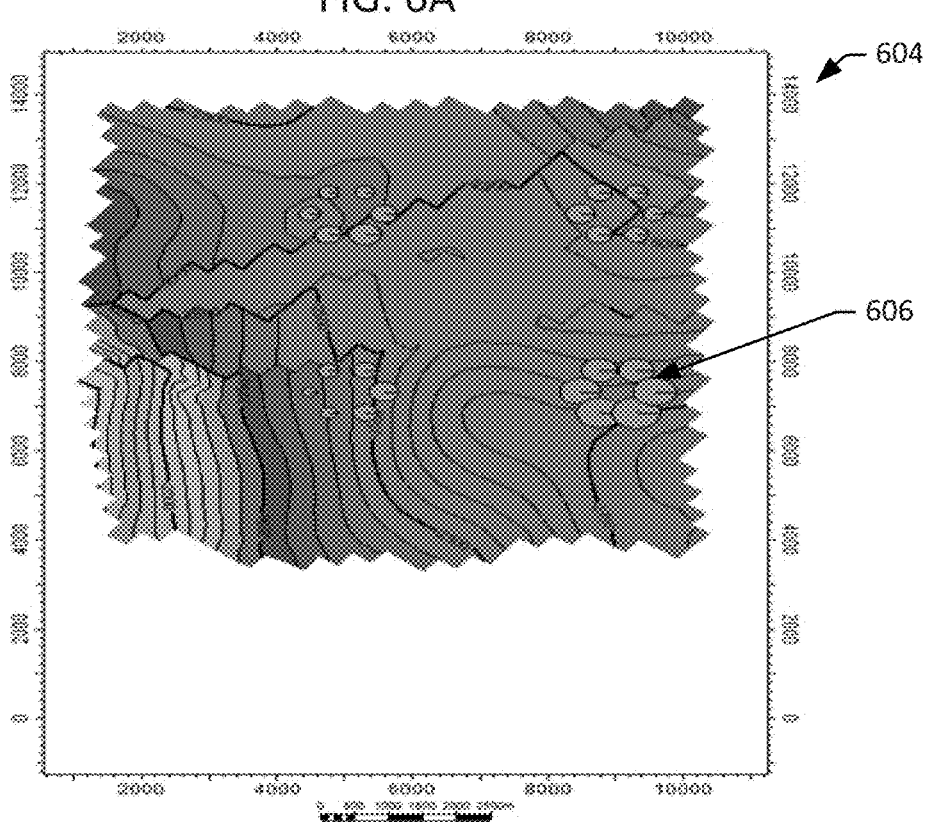
FIG. 6B is a diagram that illustrates a bubble map indicating surface locations of wells of a set of wells of an FDP in accordance with one or more embodiments.
Figure 7:
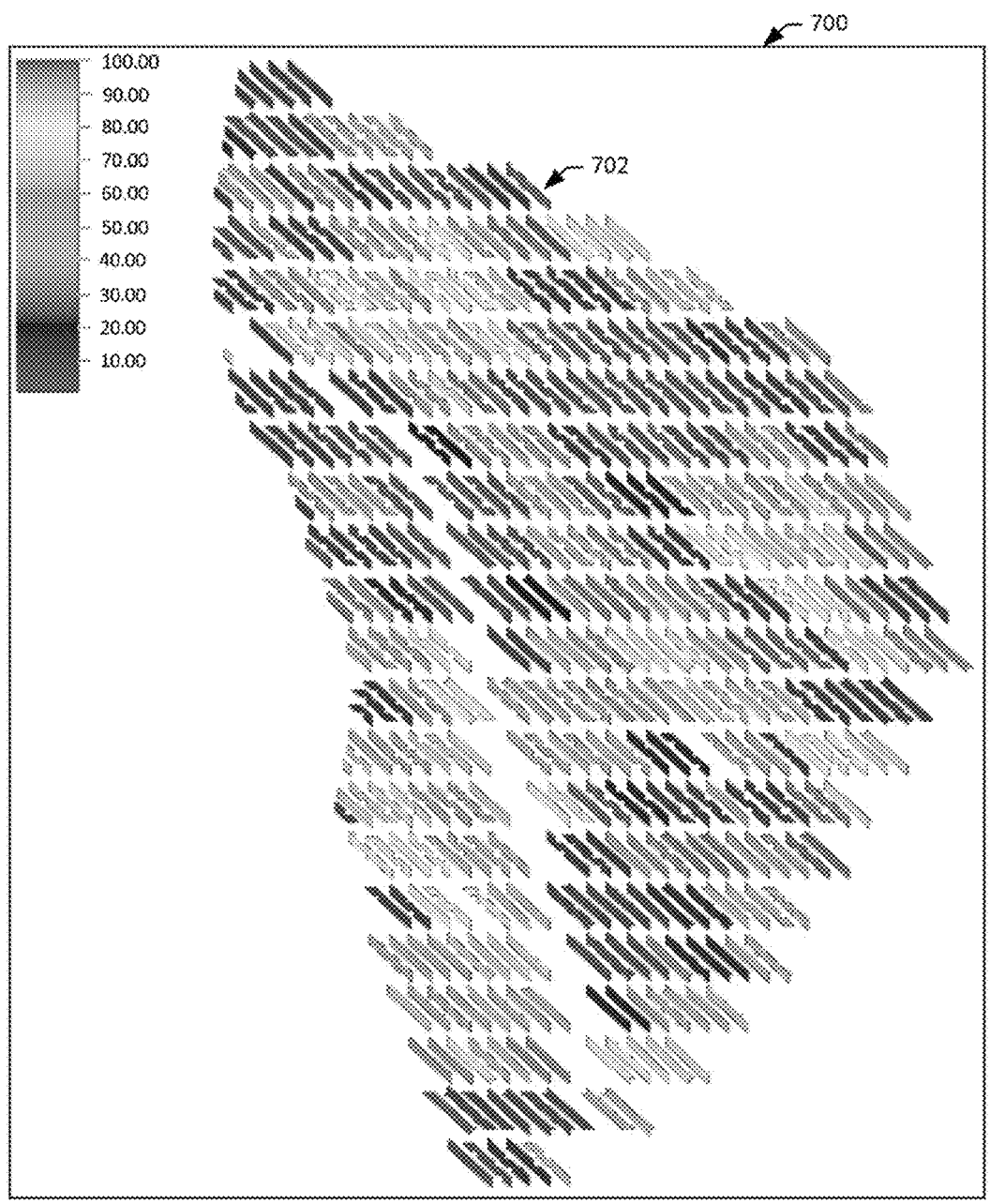
FIG. 7 is a diagram that illustrates a FDP map in accordance with one or more embodiments.

Method 300 may include generating a FDP (block 320). In some embodiments, generating a FDP includes generating a FDP 220 that is indicative of the set of wells, the physical features of the set of wells, the projected characteristics of the set of wells, and/or the like. Generating a FDP can include, for example, the reservoir development application 204 generating a FDP 220 that provides, for each well of the set of wells generated and quality checked (e.g., resulting from block 316), the well location (e.g., latitude and longitude coordinates), the well trajectory (e.g., a set of trajectory points for the main bore and/or the reservoir contact section), completion information (e.g., the location of perforations), the well length, the accumulative perforation length, the ranking/priority of the wells, and/or the like. In some embodiments, the FDP 220 may include various forms of content that can be provided to a user (e.g., displayed via FDP system 206) to facilitate understanding of the FDP. For example, the reservoir development application 204 may display (e.g., via FDP system 206 for display to user 212) a histogram of the well lengths for the wells of the set of wells of the FDP. FIG. 6A is a diagram that illustrates an example, histogram of the well lengths 602 for wells of a set of wells of an FDP in accordance with one or more embodiments. The reservoir development application 204 may display (e.g., via FDP system 206 for display to user 212) a bubble map indicating the surface locations of the wells of the set of wells of the FDP. FIG. 6B is a diagram that illustrates an example bubble map 604 indicating the surface locations of wells of a set of wells of an FDP in accordance with one or more embodiments. In some embodiments, each bubble 606 may be centered at a corresponding well location, with the size of the bubble 606 representing the well length of the well at that well location. The bubble size may be proportional to the length of the well. For example, a larger bubble 606 may represent a well with a relatively long well length and a smaller bubble 606 may represent a well with a relatively short well length. The reservoir development application 204 may display (e.g., via FDP system 206 for display to user 212) a FDP well report indicating the area of interest, well name, well length, perforation length, and/or the like for the wells of the set of wells of the FDP. FIG. 6C is a diagram that illustrates an example FDP well report 606 for a set of wells of an FDP in accordance with one or more embodiments. The reservoir development application 204 may display (e.g., via FDP system 206 for display to user 212), for some or all of the wells of the set of wells of the FDP, a well cross-section diagram indicating a completion interval for the well. FIG. 6D is a diagram that illustrates an example well cross-section diagram 608 for a well in accordance with one or more embodiments. The reservoir development application 204 may display (e.g., via FDP system 206 for display to user 212) a FDP well ranking indicating rakings and priority (e.g., based on HCPV, KH, ROI and/or the like) for the wells of the set of wells of the FDP. FIG. 6E is a diagram that illustrates an example ranking of wells 610 of a set of wells (e.g., based on HCPV) of an FDP in accordance with one or more embodiments. The reservoir development application 204 may display (e.g., via FDP system 206 for display to user 212) a FDP map including a graphical indication of well locations, trajectories, and/or priorities. Such an FDP map may include a geographical mapping that includes, for each of the proposed wells of the FDP, an element (e.g., an icon) depicted at a location corresponding to a geographical location of the well, where the elements has a length and a direction indicative of a length and a direction of a well trajectory for the well, and is visually indicative of (e.g., via a color or pattern) the ranking of the well relative to the other wells. In some embodiments, each of the elements may be user selectable (e.g., a user can click on the displayed element) to navigate to information about the associated well. FIG. 7 is a diagram that illustrates an example FDP map 700 in accordance with one or more embodiments. The FDP map 700 may include a geographical mapping corresponding to a surface 102 to region 100 that includes, for each of the proposed wells of the FDP 220, an element (e.g., an icon) 702 depicted at a location corresponding to a geographical location of a corresponding well of the FDP. Each element 702 may have a length and a direction corresponding to of a length and a direction, respectively, of a well trajectory for the well. Each element 702 may have a color, pattern and/or other visual element corresponding to the ranking of the corresponding well relative to the other wells of the FDP. In some embodiments, each of the elements 702 may be user selectable (e.g., a user can click on the displayed element 702) to navigate to information about the associated well. For example, in response to a user selecting an element 702, a pop-up window may be displayed. The pop-up window may display information about the well, such as well location, well length, HCPV, KH, ROI, a ranking, a priority, a cost to drill/produce, an oil-in-place value, and/or the like. This may allow the user 212 to quickly assess portions of the field (e.g., in the area of interest) that have relatively highly ranked wells to identify wells that should be developed first, and, if needed, select an element for a particular well to obtain more information about that well.

Method 300 may include developing a reservoir based on an FDP (block 322). In some embodiments, developing a reservoir based on an FDP includes drilling one or more hydrocarbon wells in accordance with the FDP. Referring to FIG. 1, for example, developing the reservoir 106 based on the FDP 220 may include the well development system 208 drilling some or all of the twelve wells. Each of the drilled wells may have a location, a bore hole trajectory (e.g., including a main bore and a reservoir contact section), completions (e.g., perforations in the reservoir contact section), and/or the like that correspond to a proposed well location 122, well trajectory 514, and/or the like specified for the well in the FDP 220. In some embodiments, the well development system 208 may include an automated drilling system that is configured to drill a borehole that tracks the well trajectory 514 specified for the proposed well.

In some instances, the proposed FDP 220 can be subjected to a field development optimization process. For example, the FDP 220 (including the definition of the various wells and well trajectories) can be further assessed to determine the appropriate use of each of the wells, as a production well and/or an injection well. The FDP 220 may be modified to further identify which of the well (and well trajectories) are to be employed as production and/or injection wells. In some instances, a recovery factor (RF) can be calculated for the field based on the FDP 220. In some instances, major investment decisions, for instance, expanding the current facilities (such as gas-oil separation packages (GOSPs)) in the field, are based on the FDP 220. In some instances, the FDP 220 can be used to address short and long term objectives of the field. For example, if a short term objective is to achieve a higher plateau, then the FDP 220 can be used to identify the optimum number of wells (producers and/or injectors) and trajectories to drill to achieve the higher plateau. If a long term objective is to maximize plateau or maximize oil recovery, then the FDP 220 can be used to identify the producer and injection trajectories to achieve the objective.

Figure 8:
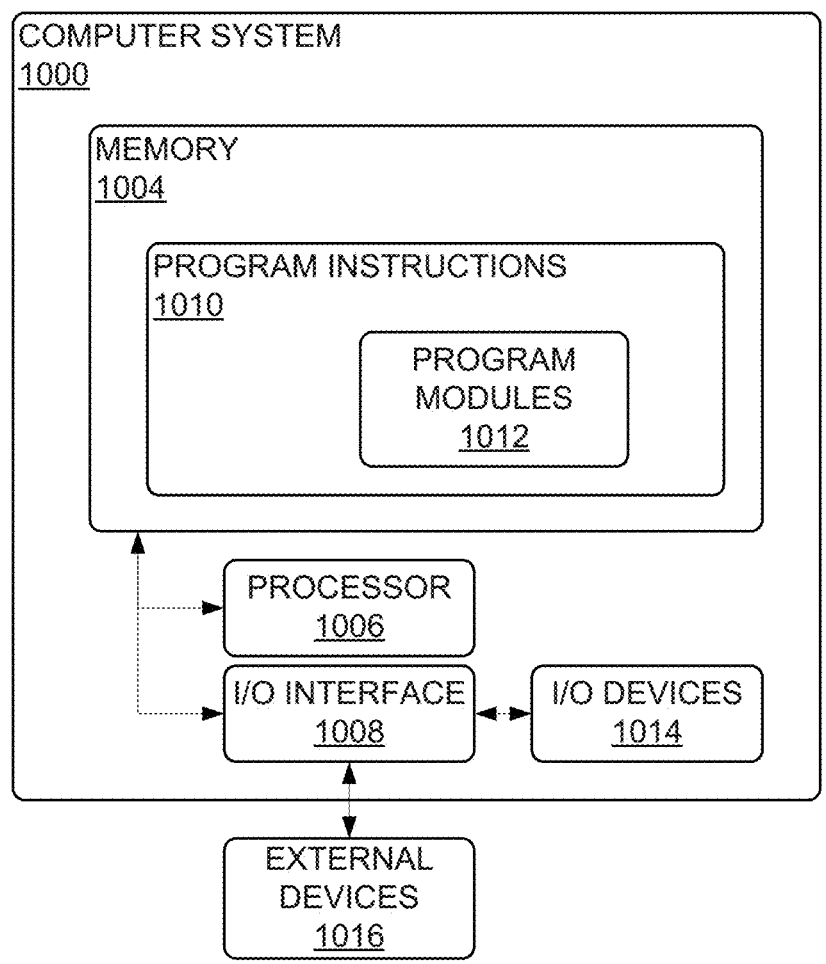
FIG. 8 is a diagram that illustrates a computer system in accordance with one or more embodiments.

FIG. 8 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the reservoir assessment system 202, the FDP system 206, the well development system 208, and/or the methods 300 and/or 400. In the context of the FDP system 206, the program modules 1012 may include the reservoir development application 204 for performing the operations described with regard to the reservoir development application 204, and/or the methods 300 and/or 400. In the context of the reservoir assessment system 202, the program modules 1012 may include one or more modules for performing the operations described with regard to the reservoir assessment system 202. In the context of the well development system 208, the program modules 1012 may include one or more modules for performing the operations described with regard to the well development system 208.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 2006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, a transceiver, and/or the like. In some embodiments, the computer system 1000 and/or the external devices 1016 may include one or more pressure gauges, temperature gauges, pumps, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A system for developing a hydrocarbon reservoir, the system comprising:
   a seismic system configured to conduct seismic testing of a hydrocarbon reservoir to generate seismic data for the hydrocarbon reservoir;
   a logging system configured to conduct logging of one or more wells in the reservoir to generate log data for the hydrocarbon reservoir;
   a field development system configured to:
      determine, based on the seismic data and the log data for the hydrocarbon reservoir, a subsurface mapping of the reservoir, the mapping comprising:
         a top limiting surface of the hydrocarbon reservoir; and
         a bottom limiting surface of the hydrocarbon reservoir;
      for each well of a plurality of wells proposed to be drilled into the hydrocarbon reservoir:
         determine well parameters comprising:
            a proposed well location indicative of a surface location of the well;
            a well azimuth indicative of a direction of a borehole for the well; and
            a well length indicative of a horizontal distance for the well;
         determine a reservoir entry location at or near the proposed well location;
         determine a reservoir exit location located a distance from the reservoir entry location corresponding to the well length and in a direction corresponding to the well azimuth;
         determine a reservoir entry point corresponding to a location at a depth of the top limiting surface directly below the reservoir entry location;
         determine a reservoir exit point corresponding to a location at a depth of the bottom limiting surface directly below the reservoir exit location; and
         determine a well trajectory comprising:
            a main bore section extending from the reservoir entry location to the reservoir entry point; and
            a reservoir contact section extending from the reservoir entry location to the reservoir exit location,
            the reservoir contact section being contained between the top limiting surface and the bottom limiting surface, and
            the reservoir contact section comprising a series of well trajectory points from the reservoir entry point to the reservoir exit point, a depth for each point of the series of well trajectory points is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of a well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0 such that the well trajectory includes a path that extends downward gradually from the reservoir entry point at the top limiting surface to the reservoir exit point at the bottom limiting surface; and
      generate a field development plan (FDP) for the hydrocarbon reservoir, the FDP comprising development information for each well of the plurality of wells, the development information for each well comprising the determined well trajectory for the well; and
   a well drilling system configured to drill a borehole for one or more of the plurality of wells, the borehole for each of the one or more wells comprising a borehole having a trajectory corresponding to the well trajectory for the well.

2. The system of claim 1, wherein the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

3. The system of claim 1, wherein the field development system is further configured to determine, based on the well trajectories determined for the plurality of wells, a ranking of the wells of the plurality of wells, wherein the FDP comprises the ranking.

4. A system for developing a hydrocarbon reservoir, the system configured to:
   determine a top limiting surface of a hydrocarbon reservoir;
   determine a bottom limiting surface of the hydrocarbon reservoir;
   for each well of a plurality of wells proposed to be drilled into the hydrocarbon reservoir:
      determine well parameters comprising:
         a proposed well location indicative of a surface location of the well;

a well azimuth indicative of a direction of a borehole for the well; and a well length indicative of a horizontal distance for the well;

determine a reservoir entry location at the proposed well location;

determine a reservoir exit location located a distance from the reservoir entry location corresponding to the well length and in a direction corresponding to the well azimuth;

determine a reservoir entry point corresponding to a location at a depth of the top limiting surface directly below the reservoir entry location;

determine a reservoir exit point corresponding to a location at a depth of the bottom limiting surface directly below the reservoir exit location; and determine a well trajectory comprising:
a main bore section extending from the reservoir entry location to the reservoir entry point; and
a reservoir contact section extending from the reservoir entry location to the reservoir exit location, the reservoir contact section being contained between the top limiting surface and the bottom limiting surface, and
the reservoir contact section comprising a series of well trajectory points from the reservoir entry point to the reservoir exit point, a depth for each point of the series of well trajectory points is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of a well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0 such that the well trajectory includes a path that extends downward gradually from the reservoir entry point at the top limiting surface to the reservoir exit point at the bottom limiting surface; and generate a field development plan (FDP) for the hydrocarbon reservoir, the FDP comprising development information for each well of the plurality of wells, the development information for each well comprising the determined well trajectory for the well.

5. The system of claim 4, wherein the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

6. The system of claim 4, wherein the system is further configured to identify the plurality of wells proposed to be drilled into the hydrocarbon reservoir, wherein identify the plurality of wells proposed to be drilled into the hydrocarbon reservoir comprises:

determine a polygon defining an area of interest for the FDP; and identify a first plurality of wells proposed to be drilled into the hydrocarbon reservoir, wherein identify the plurality of wells proposed to be drilled into the hydrocarbon reservoir comprises identifying wells of the first plurality of wells that fall within the polygon.

7. The system of claim 4, wherein identifying the plurality of wells proposed to be drilled into the hydrocarbon reservoir further comprises:

determine locations of existing well-sites; and identify any wells of the a first plurality of wells proposed to be drilled into the hydrocarbon reservoir having a proposed well location that is within a threshold well distance of any of the existing well-sites, wherein identifying the plurality of wells proposed to be drilled into the hydrocarbon reservoir comprises excluding any wells of the a first plurality of wells proposed to be drilled into the hydrocarbon reservoir determined to have a proposed well location that is within a threshold well distance of any of the existing well-sites.

8. The system of claim 4, wherein the system is further configured to:

determine a location of one or more geographic features of the hydrocarbon reservoir;

determine a threshold geographic feature distance associated with the FDP; and for each well of the plurality of wells proposed to be drilled into the hydrocarbon reservoir:
determine whether one or more points of the well trajectory for the well are located within the threshold geographic feature distance of the location of one or more geographic features; and
in response to determining that one or more points of the well trajectory for the well are located within the threshold geographic feature distance of the location of the one or more geographic features, remove the one or more points from the well trajectory for the well.

9. The system of claim 8, wherein the system is further configured to:

in response to determining that one or more points of the well trajectory for the well are located within the threshold geographic feature distance of the location of the one or more geographic features, remove any well trajectory points of the well trajectory that are closer to the reservoir exit point than the one or more points of the well trajectory for the well.

10. The system of claim 4, wherein the system is further configured to:

determine locations of well trajectories of the plurality of the well trajectories for each well of a plurality of wells proposed to be drilled into the hydrocarbon reservoir and well trajectories for any existing wells;

determine a threshold well trajectory distance associated with the FDP;

for each well of the plurality of wells proposed to be drilled into the hydrocarbon reservoir:
determine whether one or more points of the well trajectory for the well are located within the threshold well trajectory distance of another well trajectory; and
in response to determining that one or more points of the well trajectory for the well are located within the threshold well trajectory distance of another well trajectory, remove the one or more points from the well trajectory for the well.

11. The system of claim 10, wherein the system is further configured to:
in response to determining that one or more points of the well trajectory for the well are located within the threshold well trajectory distance of another well trajectory, remove any well trajectory points of the well trajectory that are closer to the reservoir exit point than the one or more points of the well trajectory for the well.

12. The system of claim 4, wherein the system is further configured to:
for each of the well trajectories:
determine a well completion, the well completion comprising a perforation section extending across at least a portion of the reservoir contact section of the well trajectory.

13. The system of claim 4, wherein the system is further configured to:
for each of the well trajectories:
determine whether the well completion for the well trajectory satisfies predefined well criteria, the well criteria comprising minimum and maximum total well length and minimum and maximum accumulative perforation length; and
in response to determining that the well completion for the well trajectory does not satisfy predefined well criteria, not including a well corresponding to the well trajectory in the FDP.

14. The system of claim 4, wherein the system is further configured to:
for each of the proposed wells of the FDP, calculate a corresponding oil-in-place for the well, wherein the oil-in-place is indicative of a production potential for the well, and wherein the oil in place for each well is determined based on the well trajectory determined for the well; and
rank the plurality of wells of the FDP based on the oil-in-place calculated for the proposed wells of the FDP,
wherein the FDP comprises an indication of the ranking the plurality of wells based on the oil in place.

15. The system of claim 4, wherein the system is further configured to:
rank the plurality of wells of the FDP; and
serve, to a computer for display via a graphical user interface, a depiction of a ranking the plurality of wells, wherein the graphical depiction of the ranking the plurality of wells comprises a geographical mapping comprising, for each well of the plurality of wells, an element depicted at a location corresponding to a geographical location of the well, wherein the element comprises a length corresponding to a length of the well and a direction corresponding to an azimuth for the well, and wherein the element comprises a color or pattern corresponding to the ranking of the well relative to the other wells of the plurality of wells.

16. The system of claim 15, wherein each element comprises an interactive element, and wherein, in response to receiving selection of the element, the system is further configured to display additional information for the well corresponding to the element.

17. The system of claim 4, wherein the system is further configured to determine, based on the well trajectories determined for the plurality of wells, a ranking of the wells of the plurality of wells, wherein the FDP comprises the ranking.

18. A method for developing a hydrocarbon reservoir, the method comprising:
determining a top limiting surface of a hydrocarbon reservoir;
determining a bottom limiting surface of the hydrocarbon reservoir;
for each well of a plurality of wells proposed to be drilled into the hydrocarbon reservoir:
determining well parameters comprising:
a proposed well location indicative of a surface location of the well;
a well azimuth indicative of a direction of a borehole for the well; and
a well length indicative of a horizontal distance for the well;
determining a reservoir entry location at or near the proposed well location;
determining a reservoir exit location located a distance from the reservoir entry location corresponding to the well length and in a direction corresponding to the well azimuth;
determining a reservoir entry point corresponding to a location at a depth of the top limiting surface directly below the reservoir entry location;
determining a reservoir exit point corresponding to a location at a depth of the bottom limiting surface directly below the reservoir exit location; and
determining a well trajectory comprising:
a main bore section extending from the reservoir entry location to the reservoir entry point; and
a reservoir contact section extending from the reservoir entry location to the reservoir exit location, the reservoir contact section being contained between the top limiting surface and the bottom limiting surface, and
the reservoir contact section comprising a series of well trajectory points from the reservoir entry point to the reservoir exit point, a depth for each point of the series of well trajectory points is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of a well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0 such that the well trajectory includes a path that extends downward gradually from the reservoir entry point at the top limiting surface to the reservoir exit point at the bottom limiting surface; and
generating a field development plan (FDP) for the hydrocarbon reservoir, the FDP comprising development information for each well of the plurality of wells, the development information for each well comprising the determined well trajectory for the well.

19. The method of claim 18, wherein the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

20. The method of claim 18, further comprising determining, based on the well trajectories determined for the plurality of wells, a ranking of the wells of the plurality of wells, wherein the FDP comprises the ranking.

21. The method of claim 18, further comprising drilling one or more wells of the plurality of wells, wherein each of the one or more wells drilled is drilled with a trajectory corresponding the well trajectory determined for the well.

22. A non-transitory computer readable storage medium comprising program instructions for developing a hydrocarbon reservoir, the program instructions executable by a computer processor to cause the following operations:
  determining a top limiting surface of a hydrocarbon reservoir;
  determining a bottom limiting surface of the hydrocarbon reservoir;
  for each well of a plurality of wells proposed to be drilled into the hydrocarbon reservoir:
    determining well parameters comprising:
      a proposed well location indicative of a surface location of the well;
      a well azimuth indicative of a direction of a borehole for the well; and
      a well length indicative of a horizontal distance for the well;
    determining a reservoir entry location at or near the proposed well location;
    determining a reservoir exit location located a distance from the reservoir entry location corresponding to the well length and in a direction corresponding to the well azimuth;
    determining a reservoir entry point corresponding to a location at a depth of the top limiting surface directly below the reservoir entry location;
    determining a reservoir exit point corresponding to a location at a depth of the bottom limiting surface directly below the reservoir exit location; and
    determining a well trajectory comprising:
      a main bore section extending from the reservoir entry location to the reservoir entry point; and
      a reservoir contact section extending from the reservoir entry location to the reservoir exit location, the reservoir contact section being contained between the top limiting surface and the bottom limiting surface, and
      the reservoir contact section comprising a series of well trajectory points from the reservoir entry point to the reservoir exit point, a depth for each point of the series of well trajectory points is determined according to the following relationship:

$$Z_{(X,Y)} = D_{(X,Y)} \times \left(\frac{n}{N-1}\right) + Z_{top,(X,Y)}$$

where $Z_{(X,Y)}$ is a depth of a well trajectory point located directly below a surface location (X,Y), $Z_{top,(X,Y)}$ is the depth of the top limiting surface directly below the surface location (X,Y), $D_{(X,Y)}$ a distance between the top limiting surface and the bottom limiting surface directly below the surface location (X,Y), N is a total number of points in the series of well trajectory points, and n is the index in the series of points with the reservoir entry point being the first point in the series and having an index of 0 such that the well trajectory includes a path that extends downward gradually from the reservoir entry point at the top limiting surface to the reservoir exit point at the bottom limiting surface; and
  generating a field development plan (FDP) for the hydrocarbon reservoir, the FDP comprising development information for each well of the plurality of wells, the development information for each well comprising the determined well trajectory for the well.

23. The medium of claim 22, wherein the top limiting surface of the hydrocarbon reservoir comprises a top limiting surface of a pay-zone of the hydrocarbon reservoir, and wherein the bottom limiting surface of the hydrocarbon reservoir comprises a bottom limiting surface of the pay-zone of the hydrocarbon reservoir.

24. The medium of claim 22, further comprising determining, based on the well trajectories determined for the plurality of wells, a ranking of the wells of the plurality of wells, wherein the FDP comprises the ranking.

* * * * *